United States Patent
Allport

(10) Patent No.: US 7,117,441 B2
(45) Date of Patent: Oct. 3, 2006

(54) GRID-BASED SYSTEM AND METHOD FOR INTERACTING WITH ELECTRONIC PROGRAM GUIDE GRID

(75) Inventor: David E. Allport, Palo Alto, CA (US)

(73) Assignee: Research Investment Network, Inc., Long Beach, CA (US)

( * ) Notice: Subject to any disclaimer, the term of this patent is extended or adjusted under 35 U.S.C. 154(b) by 884 days.

(21) Appl. No.: 10/065,889

(22) Filed: Nov. 27, 2002

(65) Prior Publication Data

US 2004/0100485 A1 May 27, 2004

(51) Int. Cl.
*G06F 3/00* (2006.01)
*G06F 11/00* (2006.01)

(52) U.S. Cl. .................. 715/721; 715/819; 715/829; 715/854; 725/39; 725/52; 725/45; 725/61

(58) Field of Classification Search ................ 715/721, 715/719, 858, 851, 819, 829; 725/52, 61, 725/39, 40, 44, 45
See application file for complete search history.

(56) References Cited

U.S. PATENT DOCUMENTS

| | | |
|---|---|---|
| 5,038,211 A | 8/1991 | Hallenbeck |
| 5,315,392 A | 5/1994 | Ishikawa et al. |
| 5,353,121 A | 10/1994 | Young et al. |
| 5,479,268 A * | 12/1995 | Young et al. .................. 386/83 |
| 5,548,338 A | 8/1996 | Ellis et al. |
| 5,592,551 A | 1/1997 | Lett et al. |
| 5,596,373 A | 1/1997 | White et al. |
| 5,629,733 A | 5/1997 | Youman et al. |
| 5,630,119 A | 5/1997 | Aristides et al. |
| 5,686,954 A | 11/1997 | Yoshinobu et al. |
| 5,689,663 A | 11/1997 | Williams |
| 5,710,601 A | 1/1998 | Marshall et al. |
| 5,710,605 A | 1/1998 | Nelson |
| 5,758,259 A | 5/1998 | Iawler |
| 5,793,438 A | 8/1998 | Bedard |
| 5,801,747 A | 9/1998 | Bedard |
| 5,805,763 A * | 9/1998 | Lawler et al. ................. 386/83 |
| 5,886,690 A * | 3/1999 | Pond et al. .................. 715/720 |
| 6,421,828 B1* | 7/2002 | Wakisaka et al. ............. 725/52 |
| 6,601,238 B1* | 7/2003 | Morrison et al. ............. 725/50 |
| 6,700,612 B1* | 3/2004 | Anderson et al. ....... 348/333.11 |
| 2002/0052864 A1* | 5/2002 | Yamamoto ..................... 701/1 |
| 2002/0184627 A1* | 12/2002 | Alba et al. .................... 725/39 |
| 2003/0106060 A1* | 6/2003 | Inoue ........................... 725/56 |
| 2005/0022241 A1* | 1/2005 | Griggs ........................ 725/48 |

* cited by examiner

*Primary Examiner*—Kristine Kincaid
*Assistant Examiner*—Ryan Pitaro
(74) *Attorney, Agent, or Firm*—Steve A. Wong; Caroline T. Do

(57) ABSTRACT

An embodiment of the invention is a technique to navigate a user interface for program selection. Program information of a plurality of program cells is displayed in a visible window. The plurality of program cells is in an electronic program guide (EPG) grid. A visual indicator is moved in the visible window from a current position in a current row to a next position in response to a user command. The next position corresponds to a program cell is the plurality of program cells. The next position is in one of the current and a next row. The visual indicator is moved in response to a user command. The command is one of a move right and a move left command.

40 Claims, 28 Drawing Sheets

| | | | |
|---|---|---|---|
| | Witness for the Prosecution. An aging barrister defends a man for murder despite damaging testimony from the accused's wife. Directed by Billy Wilder. From the Agatha Christie play. (120mins) TCM 68, 5:00-7:00pm | | |
| BOX | 4:30pm | 5:00pm | 5:30pm |
| QVC 67 | ◀ Colors of Tourmaline | Hi-Tech Today | |
| TCM 68 | ◀ Anatomy of a Murder | Witness for the Prosecution | ▶ |
| FNC 69 | ◀ Fox Report | The O' Reilly Factor | |
| OVATIO 70 | ◀ Hong Kong Symphony: | Creation Records: Alan McGee | |
| TNNP 71 | ◀ | Star Trek V: The Final Frontier | ▶ |
| HISTP 72 | ◀ Battle Stations | Modern Marvels. Then and Now | |
| TOONP 73 | Courage the Cowardly Dog | Courage the Cowardly Dog | Courage the Cowardly Dog |

*FIG. 4*

| | | | |
|---|---|---|---|
| | Witness for the Prosecution. An aging barrister defends a man for murder despite damaging testimony from the accused's wife. Directed by Billy Wilder. From the Agatha Christie play. (120mins) TCM 68, 5:00-7:00pm | | |
| BOX | 5:00pm | 5:30pm | 6:00pm |
| QVC 67 | Hi-Tech Today | | Computer Shop ▶ |
| TCM 68 | Witness for the Prosecution | | ▶ |
| FNC 69 | The O' Reilly Factor | | Direct From the War Zo.. ▶ |
| OVATIO 70 | Creation Records: Alan McGee | | Blur ▶ |
| TNNP 71 | ◀ Star Trek V: The Final Frontier | | |
| HISTP 72 | Modern Marvels: Then and Now | | Modern Marvels: Then... ▶ |
| TOONP 73 | Courage the Cowardly Dog | Courage the Cowardly Dog | Courage the Cowardly Dog |

*FIG. 5*

| Anatomy of a Murder. A Michigan lawyer and his colleague defend an Army officer for an alleged revenge killing. Directed by Otto Preminger. (180mins) TCM 68, 2:00-5:00pm ||||
|---|---|---|---|
| BOX | 4:30pm | 5:00pm | 5:30pm |
| QVC 67 | ◀ Colors of Tourmaline | Hi-Tech Today ||
| TCM 68 | Anatomy of a Murder | Witness for the Prosecution | ▶ |
| FNC 69 | ◀ Fox Report | The O' Reilly Factor ||
| OVATIO 70 | ◀ Hong Kong Symphony:... | Creation Records: Alan McGee ||
| TNNP 71 | ◀ Star Trek V: The Final Frontier ||▶|
| HISTP 72 | ◀ Battle Stations | Modern Marvels: Then and Now ||
| TOONP 73 | Courage the Cowardly Dog | Courage the Cowardly Dog | Courage the Cowardly Dog |

*FIG. 6*

| Witness for the Prosecution. An aging barrister defends a man for murder despite damaging testimony from the accused's wife. Directed by Billy Wilder. From the Agatha Christie play. (120mins) TCM 68, 5:00-7:00pm ||||
|---|---|---|---|
| BOX | 4:00pm | 4:30pm | 5:00pm |
| QVC 67 | Colors of Tourmaline || Hi-Tech Today ▶ |
| TCM 68 | ◀ Anatomy of a Murder || Witness for the Prose... ▶ |
| FNC 69 | Fox Report || The O'Reilly Factor ▶ |
| OVATIO 70 | Hong Kong Symphony: Heaven, Earth, Mankind || Creation Records: Alan.. ▶ |
| TNNP 71 | Star Trek V: The Final Frontier ||▶|
| HISTP 72 | Battle Stations || Modern Marvels: Then... ▶ |
| TOONP 73 | Courage the Cowardly Dog | Courage the Cowardly Dog | Courage the Cowardly Dog |

*FIG. 7*

Anatomy of a Murder. A Michigan lawyer and his colleague defend an Army officer for an alleged revenge killing. Directed by Otto Preminger. (180mins)
TCM 68, 2:00-5.00pm

| BOX | 4:00pm | 4:30pm | 5:00pm |
|---|---|---|---|
| QVC 67 | Colors of Tourmaline | | Hi-Tech Today |
| TCM 68 | Anatomy of a Murder | | Witness for the Prosec. ▶ |
| FNC 69 | ◀ Fox Report | | The O' Reilly Factor ▶ |
| OVATIO 70 | Hong Kong Symphony:... | | Creation Records: Alan.. ▶ |
| TNNP 71 | Star Trek V: The Final Frontier | | ▶ |
| HISTP 72 | Battle Stations | | Modern Marvels: Then.. ▶ |
| TOONP 73 | Courage the Cowardly Dog | Courage the Cowardly Dog | Courage the Cowardly.. ▶ |

*FIG. 8*

Guarding Tess. A Secret Service agent is reassigned to protect a defiant former first lady at her Ohio home. (120mins)
TBS 22, 9 30-11:30pm

| BOX | 9:00pm | 9:30pm | 10:00pm |
|---|---|---|---|
| ESPN 72 | ◀ Tennis | | Pardon the Interruption ▶ |
| TBS 22 | ◀ The Hand That Rocks... | Guarding Tess | ▶ |
| CSPAN 52 | ◀ Prime Time Public Affairs | | ▶ |
| AMC 15 | ◀ Racing With the Moon | | Sheena ▶ |
| TCM 68 | ◀ The Glenn Miller Story | The Buddy | Holly Story ▶ |
| BRAVO 59 | ◀ Vital Signs | | Musicians ▶ |
| USAP 44 | ◀ Casino | | ▶ |

*FIG. 9*

| \multicolumn{4}{l}{The Hand That Rocks the Cradle. To carry out her plan of revenge, an unhinged woman charms a Seattle couple into hiring her as a nanny. (135mins)  TBS 22, 7:15-9:30pm} |
|---|---|---|---|
| BOX | 8:00pm | 8 30pm | 9:00pm |
| ESPN 76 | Tennis ▶ | | |
| TBS 22 | The Hand That Rocks the Cradle | | |
| CSPAN 52 | Prime Time Public Affairs ▶ | | |
| AMC 15 | ◀ Racing With the Moon | | |
| TCM 68 | ◀ The Glenn Miller Story | | |
| BRAVO 59 | Vital Signs ▶ | | |
| USAP 44 | Casino ▶ | | |

FIG. 10

| \multicolumn{6}{l}{Rick Steves Europe. Rick takes you to explore the unknowns of Europe (35mins)  KQED 9, 2:00-2:35pm} |
|---|---|---|---|---|---|
| BOX | 2:00pm | | 2:30pm | | 3:00pm |
| KQED 9 | Rick Steves Europe | | Rick Steves Europe | | R. Steves ▶ |
| NJKP 11 | As Told by Ginger | | Rock Power | Rock Power | Rugrats | Rugrats |
| KBHK 12 | Wimps ▶ | | | | |
| KBWB 13 | Sir Arthur Conan Doyle's The Lost World | | | | Mutant X ▶ |
| KDTV 14 | Caliente | | | | Al Fin de Semana ▶ |
| AMC 15 | ◀ Alien Nation | | Backstory | | Raiders of the Lost Ark ▶ |
| KKPX 16 | No Information | | | | FLW Outdoors: Bass Fish ▶ |

FIG. 11

| NIKP 11, 3:15-3:30pm: Rugrats. A poker game at Aunt Miriam's house. (15mins) | | | |
|---|---|---|---|
| | | | NIKP 11, 3:15-3:30pm |
| BOX | 2:00pm | 2:30pm | 3:00pm |
| KQED 9 | Rick Steves Europe | Rick Steves Europe | Rick Steves Eu.. ▶ |
| NIKP 11 | As Told by Ginger | Rock Power / Rock Power | Rugrats / Rugrats |
| KBHK 12 | Wimps | | ▶ |
| KBWB 13 | Sir Arthur Conan Doyle's The Lost Word | | Mutant X ▶ |
| KDTV 14 | Caliente | | Al Fin de Semana ▶ |
| AMC 15 | ◀ Alien Nation | Backstory | Raiders of the Lost Ark ▶ |
| KKPX 16 | No Information | | FLW Outdoors: Bass Fish ▶ |

*FIG. 12*

| BOX | 2:00pm | 2:30pm | 3:00pm | |
|---|---|---|---|---|
| KQED 9 | Rick Steves Europe | Rick Steves Europe | Rick Steves Eu.. | ▶ |
| NIKP 11 | As Told by Ginger | Rock Power | Rock Power | Rugrats | Rugrats |
| KBHK 12 | Wimps | | | ▶ |
| KBWB 13 | Sir Arthur Conan Doyle's The Lost World | | Mutant X | ▶ |
| KDTV 14 | Caliente | | Al Fin de Semana | ▶ |
| AMC 15 | ◀ Alien Nation | Backstory | Raiders of the Lost Ark | ▶ |
| KKPX 16 | No Information | | FLW Outdoors: Bass Fish | ▶ |

Rick Steves Europe. Travel deals; planning a trip; language barriers; accommodations; safety. (35mins)
KQED 9, 2:00-2:35pm

FIG. 14

KBHK 12, 2:00-4:00pm: Wimps. A wimpy college freshman helps a star quarterback woo a brainy librarian. (120mins)
KBHK 12, 2:00-4:00pm

| BOX | 2:00pm | 2:30pm | 3:00pm | |
|---|---|---|---|---|
| KQED 9 | Rick Steves Europe | Rick Steves Europe | Rick Steves Eu.. | ▶ |
| NIKP 11 | As Told by Ginger | Rock Power | Rock Power | Rugrats | Rugrats |
| KBHK 12 | Wimps | | | ▶ |
| KBWB 13 | Sir Arthur Conan Doyle's The Lost World | | Mutant X | ▶ |
| KDTV 14 | Caliente | | Al Fin de Semana | ▶ |
| AMC 15 | ◀ Alien Nation | Backstory | Raiders of the Lost Ark | ▶ |
| KKPX 16 | No Information | | FLW Outdoors: Bass Fish | ▶ |

FIG. 15

| KBWB 13, 2:00-3:00pm: Sir Arthur Conan Doyle's The Lost World. Malone becomes the link between a knife and the murders of Jack the Ripper. (60mins) KBWB 13 2:00-3:00pm |||||
|---|---|---|---|---|
| BOX | 2:00pm | 2:30pm | | 3:00pm |
| KQED 9 | Rick Steves Europe | Rick Steves Europe | | Rick Steves Eu... ▶ |
| NIKP 11 | As Told by Ginger | Rock Power | Rock Power | Rugrats / Rugrats |
| KBHK 12 | Wimps |||  ▶ |
| KBWB 13 | Sir Arthur Conan Doyle's The Lost World ||| Mutant X ▶ |
| KDTV 14 | Caliente ||| Al Fin de Semana ▶ |
| AMC 15 | ◀ Alien Nation | Backstory || Raiders of the Lost Ark ▶ |
| KKPX 16 | No Information |||  FLW Outdoors: Bass Fish ▶ |

FIG. 16

| KBWB 13, 3:00-4:00pm: Mutant X. Adam and the Mutant X team are on a mission to protect Ashley Elliot, a new mutant whose insatiable consumption of electricity causes citywide blackouts. (60mins) KBWB 13, 3:00-4:00pm |||||
|---|---|---|---|---|
| BOX | 2:00pm | 2:30pm | | 3:00pm |
| KQED 9 | Rick Steves Europe | Rick Steves Europe | | Rick Steves Eu... ▶ |
| NIKP 11 | As Told by Ginger | Rock Power | Rock Power | Rugrats / Rugrats |
| KBHK 12 | Wimps |||  ▶ |
| KBWB 13 | Sir Arthur Conan Doyle's The Lost World ||| Mutant X ▶ |
| KDTV 14 | Caliente ||| Al Fin de Semana ▶ |
| AMC 15 | ◀ Alien Nation | Backstory || Raiders of the Lost Ark ▶ |
| KKPX 16 | No Information |||  FLW Outdoors: Bass Fish ▶ |

FIG. 17

| NIKP 11, 3:15-3:30pm: Rugrats. A poker game at Aunt Miriam's house. (15mins) | | | | | |
|---|---|---|---|---|---|
| | | | | NIKP 11, 3:15-3:30pm | |
| BOX | 2:00pm | | 2:30pm | 3:00pm | |
| KQED 9 | Rick Steves Europe | | Rick Steves Europe | Rick Steves Eu .. | ▶ |
| NIKP 11 | As Told by Ginger | | Rock Power | Rock Power | Rugrats | Rugrats |
| KBHK 12 | Wimps | | | | ▶ |
| KBWB 13 | Sir Arthur Conan Doyle's The Lost World | | | Mutant X | ▶ |
| KDTV 14 | Caliente | | | Al Fin de Semana | ▶ |
| AMC 15 | Alien Nation | | Backstory | Raiders of the Lost Ark | ▶ |
| KKPX 16 | No Information | | | FLW Outdoors: Bass Fish | ▶ |

*FIG. 19*

| AMC 15, 2:55-5:00pm: Raiders of the Lost Ark. Indiana Jones braves snakes and Nazis to find the biblical ark of the covenant. Directed by Steven Spielberg. (125mins) | | | | | |
|---|---|---|---|---|---|
| BOX | 2:00pm | | 2:30pm | 3:00pm | |
| KQED 9 | Rick Steves Europe | | Rick Steves Europe | Rick Steves Eu... | ▶ |
| NIKP 11 | As Told by Ginger | | Rock Power | Rock Power | Rugrats | Rugrats |
| KBHK 12 | Wimps | | | | ▶ |
| KBWB 13 | Sir Arthur Conan Doyle's The Lost World | | | Mutant X | ▶ |
| KDTV 14 | Caliente | | | Al Fin de Semana | ▶ |
| AMC 15 | Alien Nation | | Backstory | Raiders of the Lost Ark | ▶ |
| KKPX 16 | No Information | | | FLW Outdoors: Bass Fish | ▶ |

*FIG. 20*

| AMC 15, 2:25-2:55pm: Backstory. "Die Hard" and its sequels are very successful. (30mins) | | | | |
|---|---|---|---|---|
| BOX | 2:00pm | 2:30pm | | 3:00pm |
| KQED 9 | Rick Steves Europe | | Rick Steves Europe | Rick Steves Eu... ▶ |
| NIKP 11 | As Told by Ginger | Rock Power | Rock Power | Rugrats | Rugrats |
| KBHK 12 | Wimps | | | ▶ |
| KBWB 13 | Sir Arthur Conan Doyle's The Lost World | | | Mutant X ▶ |
| KDTV 14 | Caliente | | | Al Fin de Semana ▶ |
| AMC 15 | ◀ Alien Nation | Backstory | | Raiders of the Lost Ark ▶ |
| KKPX 16 | No Information | | | FLW Outdoors: Bass Fish ▶ |

FIG. 21

| AMC 15, 2:25-2:55pm: Backstory. "Die Hard" and its sequels are very successful. (30mins) | | | | |
|---|---|---|---|---|
| | AMC 15, 2:25-2:55pm | | | |
| BOX | 2:00pm | 2:30pm | | 3:00pm |
| KQED 9 | Rick Steves Europe | | Rick Steves Europe | Rick Steves Eu... ▶ |
| NIKP 11 | As Told by Ginger | Rock Power | Rock Power | Rugrats | Rugrats |
| KBHK 12 | Wimps | | | ▶ |
| KBWB 13 | Sir Arthur Conan Doyle's The Lost World | | | Mutant X ▶ |
| KDTV 14 | Caliente | | | Al Fin de Semana ▶ |
| AMC 15 | ◀ Alien Nation | Backstory | | Raiders of the Lost Ark ▶ |
| KKPX 16 | No Information | | | FLW Outdoors: Bass Fish ▶ |

FIG. 22

| \multicolumn{4}{l|}{TCM 68, 7:30-9:30am: The Letter. A woman in Malaya kills a man, telling her husband and lawyer it was self-defense. Directed by William Wyler. (120mins)} |
|---|---|---|---|

| BOX | 8:30am | 9:00am | 9:30am |
|---|---|---|---|
| TBS 22 | The Cosby Show | Extreme Measures | |
| CSPAN 52 | ◄ Washington Journal | | |
| AMC 15 | ◄ Indiana Jones and the Temple of Doom | | ► |
| TCM 68 | ◄ The Letter | | Adam's Rib ► |
| BRAVO 59 | ◄ Hill Street Blues | Hill Street Blues | |
| USAP 44 | Go for It! | No information | |
| TNTP 19 | ◄ When a Stranger Calls Back | | |

FIG. 23

TCM 68, 9:30-11:30am: Adam's Rib. Married lawyers clash in and out of court over a woman's right to shoot her husband and his girlfriend. Directed by George Cukor. (120mins)

| BOX | 8:30am | 9:00am | 9:30am |
|---|---|---|---|
| TBS 22 | The Cosby Show | Extreme Measures | ► |
| CSPAN 52 | ◄ Washington Journal | | |
| AMC 15 | ◄ Indiana Jones and the Temple of Doom | | ► |
| TCM 68 | ◄ The Letter | | Adam's Rib ► |
| BRAVO 59 | ◄ Hill Street Blues | Hill Street Blues | |
| USAP 44 | Go for It! | No information | |
| TNTP 19 | ◄ When a Stranger Calls Back | | |

FIG. 24

| | | | |
|---|---|---|---|
| TCM 68, 9:30-11:30am: Adam's Rib. Married lawyers clash in and out of court over a woman's right to shoot her husband and his girlfriend. Directed by George Cukor. (120mins) | | | |
| BOX | 9:00am | 9:30am | 10:00am |
| TBS 22 | Extreme Measures | | |
| CSPAN 52 | Washington Journal | | Public Affairs |
| AMC 15 | Indiana Jones and the Temple of Doom | | True Grit |
| TCM 68 | The Letter | | Adam's Rib |
| BRAVO 59 | Hill Street Blues | | Making Of: Monsters, Inc. |
| USAP 44 | No Information | | Matter of Trust |
| TNTP 19 | When a Stranger Calls Back | | Murder Live! |

FIG. 25

| | | | |
|---|---|---|---|
| TBS 22, 9:00-11:30am: Extreme Measures. A homeless man's mysterious death puts an emergency-room physician on the trail of a doctor who experiments on the living. (150mins) | | | |
| BOX | 10:30am | 11:00am | 11:30am |
| TBS 22 | Extreme Measures | | Uncommon Valor |
| CSPAN 52 | Public Affairs | | |
| AMC 15 | True Grit | | |
| TCM 68 | Adam's Rib | | The Caine Mutiny |
| BRAVO 59 | The Cotton Club | | |
| USAP 44 | Matter of Trust | | |
| TNTP 19 | Murder Live! | | |

FIG. 26

| TCM 68, 11:30-2:00pm: The Caine Mutiny. A World War II Navy officer is court-martialed for relieving paranoid Capt. Queeg in a typhoon. Directed by Edward Dmytryk. (150mins) ||||
|---|---|---|---|
| BOX | 11:30am | 12:00am | 12:30pm |
| TBS 22 | | Uncommon Valor | |
| CSPAN 52 | | Public Affairs ||
| AMC 15 | | True Grit | Alien Nation |
| TCM 68 | | The Caine Mutiny | |
| BRAVO 59 | | The Cotton Club ||
| USAP 44 | | Matter of Trust | Sweet Poison |
| TNTP 19 | Murder Live! | Midnight in the Garden of Good and Evil ||

*FIG. 27*

| TBS 22, 11:30-1:30pm: Uncommon Valor. A colonel with a sponsor leads five Marine veterans into Laos to find his son and others missing in action. (120mins) ||||
|---|---|---|---|
| BOX | 12:30pm | 1:00pm | 1:30pm |
| TBS 22 | | Uncommon Valor | BAT 21 |
| CSPAN 52 | | Public Affairs ||
| AMC 15 | | Alien Nation ||
| TCM 68 | | The Caine Mutiny ||
| BRAVO 59 | The Cotton Club | | To Sir, With Love |
| USAP 44 | | Sweet Poison ||
| TNTP 19 | | Midnight in the Garden of Good and Evil ||

*FIG. 28*

| | | | |
|---|---|---|---|
| TCM 68, 2:00-5:00pm: Anatomy of a Murder. A Michigan lawyer and his colleague defend an Army officer for an alleged revenge killing. Directed by Otto Preminger. (180mins) TCM 68, 2:00-5:00pm | | | |
| BOX | 1:30pm | 2:00pm | 2:30pm |
| TBS 22 | BAT 21 | | |
| CSPAN 52 | Public Affairs | | |
| AMC 15 | Alien Nation | | Backstory |
| TCM 68 | The Caine Mutiny | Anatomy of a Murder | |
| BRAVO 59 | To Sir, With Love | | |
| USAP 44 | Sweet Poison | | The China Lake Murder |
| TNTP 19 | Midnight in the Garden of Good and Evil | | |

*FIG. 29*

| | | | |
|---|---|---|---|
| TCM 68, 7:30-9:30am: The Letter. A woman in Malaya kills a man, telling her husband and lawyer it was self defense. Directed by William Wyler. (120mins) TCM 68, 7:30-9:30am | | | |
| BOX | 9:00am | 9:30am | 10:00am |
| TBS 22 | Extreme Measures | | |
| CSPAN 52 | Washington Journal | | Public Affairs |
| AMC 15 | Indiana Jones and the Temple of Doom | | True Grit |
| TCM 68 | The Letter | Adam's Rib | |
| BRAVO 59 | Hill Street Blues | | Making Of: Monsters Inc. |
| USAP 44 | No information | | Matter of Trust |
| TNTP 19 | When a Stranger Calls Back | | Murder Live! |

*FIG. 30*

| TCM 68, 2:00-5:00pm: Anatomy of a Murder. A Michigan lawyer and his colleague defend an Army officer for an alleged revenge killing. Directed by Otto Preminger. (180mins) | | | |
|---|---|---|---|
| BOX | 4:30pm | 5:00pm | 5:30pm |
| QVC 67 | ◀ Colors of Tourmaline | Hi-Tech Today | |
| TCM 68 | ◀ Anatomy of a Murder | Witness for the Prosecution | ▶ |
| FNC 69 | ◀ Fox Report | The O'Reilly Factor | |
| OVATIO 70 | ◀ Hong Kong Symphony:... | Creation Records: Alan McGee | |
| TNNP 71 | ◀ | Star Trek V: The Final Frontier | ▶ |
| HISTP 72 | ◀ Battle Stations | Modern Marvels: Then and Now | |
| TOONP 73 | Courage the Cowardly Dog | Courage the Cowardly Dog | Courage the Cowardly Dog |

*FIG. 34*

| TCM 68, 5:00-7:00pm: Witness for the Prosecution. An aging barrister defends a man for murder despite damaging testimony from the accused's wife. Directed by Billy Wilder. From the Agatha Christie play. (120mins) | | | |
|---|---|---|---|
| BOX | 5:30pm | 6:00pm | 6:30pm |
| QVC 67 | ◀ Hi-Tech Today | Computer Shop | |
| TCM 68 | ◀ | Witness for the Prosecution | |
| FNC 69 | ◀ The O'Reilly Factor | Direct From the War Zone | |
| OVATIO 70 | ◀ Creation Records: Alan... | Blur | |
| TNNP 71 | ◀ Star Trek V: The Final Frontier | | Con. Zone |
| HISTP 72 | ◀ Modern Marvels: Then... | Modern Marvels: Then and Now | |
| TOONP 73 | Courage the Cowardly Dog | Dexter's Laboratory | Dexter's Laboratory |

*FIG. 35*

| TCM 68, 2:00-5:00pm: Anatomy of a Murder. A Michigan lawyer and his colleague defend an Army officer for an alleged revenge killing. Directed by Otto Preminger. (180mins) |||||
|---|---|---|---|---|
| BOX | 2:00pm || 2:30pm | 3:00pm |
| QVC 67 | Denim & Co. ||| QVC Sampler ▶ |
| TCM 68 | Anatomy of a Murder ▶ ||||
| FNC 69 | ◀ America at War ||| The Beltway Boys |
| OVATIO 70 | Angkor for Sale ||| East Meets West With ▶ |
| TNNP 71 | Hot Rod || Car and Driver Television | Monster Jam ▶ |
| HISTP 72 | ◀ Tobruk ||| The Great Ships ▶ |
| TOONP 73 | Dragon Ball Z || Dragon Ball Z | Courage the Cowardly Dog |

*FIG. 36*

| SCIFIP 78, 3:00-5:00pm: Wes Craven Presents Mind Ripper. A worker on a secret project falls to his death, but a scientist's new virus brings him back with an appetite for human brains. (120mins) |||||
|---|---|---|---|---|
| BOX | 4:30pm | 5:00pm || 5:30pm |
| AMC 15 | ◀ Raiders of the Lost Ark | Indiana Jones and the Temple of Doom ||▶ |
| TCM 68 | ◀ Anatomy of a Murder | Witness for the Prosecution ||▶ |
| BRAVO 59 | ◀ Musicians | The Package ||▶ |
| USAP 44 | Speed ||| ▶ |
| TNTP 19 | ◀ Heaven's Prisoners ||| The Client ▶ |
| SCIFIP 78 | ◀ Wes Craven Presents M. | Rawhead Rex ||▶ |
| ESPN 17 | ◀ College Basketball | College Basketball ||▶ |

*FIG. 37*

| SCIFIP 78, 5:00-7:00pm: Rawhead Rex. A U.S. historian takes his wife and son to an Irish town where the oozing devil incarnate dwells. (120mins) | | | |
|---|---|---|---|
| BOX | 6:30pm | 7:00pm | 7:30pm |
| AMC 15 | ◀ Indiana Jones and the Temple of... | | Batman ▶ |
| TCM 68 | ◀ Witness for the Prosec... | Philadelphia | ▶ |
| BRAVO 59 | ◀ The Package | Broadway's Best From Bravo | ▶ |
| USAP 44 | ◀ Speed | I Come in Peace | ▶ |
| TNTP 19 | ◀ | The Client | |
| SCIFIP 78 | ◀ Rawhead Rex | Star Trek VI: The Undiscovered Country | ▶ |
| ESPN 17 | ◀ College Basketball | College Basketball | ▶ |

FIG. 38

| Guarding Tess. A Secret Service agent is reassigned to protect a defiant former first lady at her Ohio home. (135mins) TBS 22, 5:00-7:15pm | | | |
|---|---|---|---|
| BOX | 7:00pm | 7:30pm | 8:00pm |
| ESPN 76 | ◀ NHL Hockey | | Tennis ▶ |
| TBS 22 | ◀ Guarding T.. | The Hand That Rocks the Cradle | ▶ |
| CSPAN 52 | ◀ Prime Time Public Affair | | Prime Time Public Affair ▶ |
| AMC 15 | Backstory | Racing With the Moon | ▶ |
| TCM 68 | ◀ The Elephant Man | The Glenn Miller Story | ▶ |
| BRAVO 59 | Musicians | | Vital Signs ▶ |
| USAP 44 | JAG | | Casino ▶ |

FIG. 39

| \multicolumn{4}{l}{TCM 68, 2:00-5:00pm: Anatomy of a Murder. A Michigan lawyer and his colleague defend an Army officer for an alleged revenge killing. Directed by Otto Preminger. (180mins)} |
|---|---|---|---|
| BOX | 3:30pm | 4:00pm | 4:30pm |
| QVC 67 | ◄ QVC Sampler | Colors of Tourmaline | |
| TCM 68 | ◄ | Anatomy of a Murder | |
| FNC 69 | ◄ Fox News Watch | Fox Report | |
| OVATIO 70 | ◄ East Meets West With D... | Hong Kong Symphony: Heaven, Earth, Mankind | |
| TNNP 71 | ◄ Monster Jam | Star Trek V: The Final Frontier | ► |
| HISTP 72 | ◄ The Great Shops | Battle Stations | |
| TOONP 73 | Courage the Cowardly Dog | Courage the Cowardly Dog | Courage the Cowardly Dog |

*FIG. 40*

| | Anatomy of a Murder. A Michigan lawyer and his colleague defend an Army officer for an alleged revenge killing. Directed by Otto Preminger. (180mins)<br>TCM 68, 2:00-5:00pm |
|---|---|---|---|
| BOX | 4:00pm | 4:30pm | 5:00pm |
| QVC 67 | colspan="2" | Colors of Tourmaline | Hi-Tech Today |
| TCM 68 | colspan="2" | Anatomy of a Murder | Witness for the Prosec... ▶ |
| FNC 69 | ◀ colspan="2" | Fox Report | The O' Reilly Factor ▶ |
| OVATIO 70 | colspan="2" | Hong Kong Symphony: Heaven, Earth, Mankind | Creation Records: Alan.. ▶ |
| TNNP 71 | colspan="3" | Star Trek V: The Final Frontier | ▶ |
| HISTP 72 | colspan="2" | Battle Stations | Modern Marvels: Then... ▶ |
| TOONP 73 | Courage the Cowardly Dog | Courage the Cowardly Dog | Courage the Cowardly... ▶ |

*FIG. 41*

| | CSPAN 52, 10:00-3:45pm: Public Affairs. (345mins) |
|---|---|---|---|
| BOX | 9:00am | 9:30am | 10:00pm |
| TBS 22 | colspan="3" | Extreme Measures | ▶ |
| CSPAN 52 | ◀ colspan="2" | Washington Journal | Public Affairs ▶ |
| AMC 15 | ◀ colspan="2" | Indiana Jones and the Temple of Doom | True Grit ▶ |
| TCM 68 | ◀ | The Letter | colspan="2" | Adam's Rib ▶ |
| BRAVO 59 | colspan="2" | Hill Street Blues | Making Of: Monsters, Inc. |
| USAP 44 | colspan="2" | No Information | Matter of Trust ▶ |
| TNTP 19 | ◀ colspan="2" | When a Stranger Calls Back | Murder Live! ▶ |

*FIG. 42*

| TCM 68, 5:00-7:00pm: Witness for the Prosecution. An aging barrister defends a man for murder despite damaging testimony from the accused's wife. Directed by Billy Wilder. From the Agatha Christie play. (120mins) |||| 
|---|---|---|---|
| BOX | 5:30pm | 6:00pm | 6:30pm |
| QVC 67 | Hi-Tech Today || Computer Shop ▶ |
| TCM 68 | Witness for the Prosecution ▶ |||
| FNC 69 | The O'Reilly Factor || Direct From the War Zone ▶ |
| OVATIO 70 | Creation Records: Alan McGee || Blur ▶ |
| TNNP 71 | ◀ Star Trek V: The Final Frontier |||
| HISTP 72 | Modern Marvels: Then and Now || Modern Marvels: Then... ▶ |
| TOONP 73 | Courage the Cowardly Dog | Courage the Cowardly Dog | Dexter's Laboratory |

*FIG. 43*

GRID-BASED SYSTEM AND METHOD FOR INTERACTING WITH ELECTRONIC PROGRAM GUIDE GRID

RELATED APPLICATION(S)

This application contains subject matter related to copending U.S. patent application Ser. No. 10/065,075, entitled "Point-Based System and Method For Interacting with Electronic Program Guide Grid", filed Sep. 13, 2002, invented by the same inventor as the present invention, and is assigned to the same assignee as the present invention. The entire original disclosure of said co-pending application is herein expressly incorporated by reference.

BACKGROUND OF THE INVENTION

FIELD OF THE INVENTION

The present invention relates generally to methods of interacting with displayed data, and more specifically to methods of interacting with electronic program guide (EPG) data displayed in a grid format.

The two-dimensional grids that are typical of EPG information displays have the property that in the vertical (channel) dimension, the grid cells corresponding to television programs have the same size, but in the horizontal (time) dimension, they have unequal sizes due to the different lengths of the programs. Furthermore, the boundaries of the program cells on different channels frequently do not align with each other, and this leads to a variety of problems when attempting to provide a simple and reliable method of grid navigation. In the typical scenario where a remote control is used to issue "up", "down", "left" and "right" commands as the primary method of control for grid navigation, early attempts to solve these problems have given rise to methods that are inconsistent and unpredictable in their results, and inefficient. More recent EPG grids exist that are not based upon assigning channels to the vertical dimension, but which instead assign particular categories of content (such as "drama", "comedy", "sports" etc) to each row of the grid. The navigation problems encountered with channel-based EPG grids may also occur for these newer types of EPG grid, because of their similar irregular cell structure, and the solutions described herein are equally applicable to these grids.

In the EPG systems of the prior art there is typically one "active" program in the grid, and supplementary program information for this program is displayed in a separate area of the display. Two different types of motion are controlled by the user's navigation commands. The first type of motion is motion of the active program indicator with respect to the EPG data. This motion includes horizontal repositioning of the visual indicator of the active program to indicate a different program on the same channel, or, in the case of category-based EPG grids, a different program in the same category. This first type of motion also includes vertical repositioning to a program on a different channel, or, in the case of category-based EPG grids, to a program in a different category. The second type of motion is motion of the visible window onto the EPG data. This includes moving horizontally to select an earlier or later displayed time period for the grid, in order to show an earlier or later set of programs on the same set of channels (or categories). It also includes moving vertically to show a set of programs at the same times on a different set of channels (or categories).

There are two primary sources of navigational difficulty in these prior art EPG systems. Firstly, because the program start times and durations on different rows of an EPG grid are frequently different, the horizontal motion that results from a "move right" or "move left" command will frequently differ depending upon which grid row is currently active. The result of these differences in horizontal motion that is that, in general, the result of a "move up" followed by a "move left" command will not be the same as the result of a "move left" followed by a "move up" command. In other words, using terminology borrowed from the description of mathematical operations, the commands for vertical and horizontal motion are not commutative. This can cause users to be confused when they issue a series of commands attempting to navigate to one cell in the grid, and find that the indicator of the active program has moved to a different cell.

The second source of navigational difficulty in prior art EPG systems is that the horizontal motion resulting from pairs of "move left" and "move right" commands may be asymmetrical. Asymmetry as used herein implies that if the user issues a "move left" command followed by a "move right" command (or vice versa), the state that the system ends up in will not be the same as the state it started in. To use terminology borrowed from the description of mathematical operations, there are no prior art systems in which "left" and "right" movements are the inverse of each other. This is a significant drawback in the context of user interactions wherein errors may arise for various reasons. For example, if the user accidentally issues a "move right" command, issuing a subsequent "move left" command will not necessarily "undo" the system changes that occurred in response to the "move right" command. Therefore it may be relatively difficult or tedious to return the system to the state that it was in prior to the issuance of the first (erroneous) command. Depending upon the different approaches to grid navigation, there are differences in the exact nature of the previous changes which are not "undone" when the user issues a horizontal move command in the opposite direction to a prior horizontal move command. The asymmetries found in prior art EPG navigation methods may be categorized as being of four kinds:

1. Asymmetries in the position of the visible window; i.e. the grid displayed time period in the final state is different from the grid displayed time period in the initial state.

2. In systems which use two-dimensional cell highlighting, asymmetries in the size of the highlighted cell in the initial and final states.

3. In systems which use a "point-based" indicator of the active program, asymmetries in the exact position of the information line (or other indicator of the information point) with respect to the start of the active program, even though it may intersect the same set of programs in the initial and final states.

4. Asymmetries in the active program, such that the active program in the initial and final states may be different.

Prior art systems determine the horizontal motion of the visual indicator of the active program in one of two ways. First, it may be determined by a global policy, irrespective of the sizes of the program cells in a particular grid. The second alternative is that the motion may be determined by a policy which calculates horizontal motion from the durations and start times of the program cells on the currently active grid row. Moreover, in systems prior to the point-based invention, the size of the visual indicator is also determined by one of these policies.

In some prior art systems, horizontal navigation is based upon a global policy of movement, regardless of the data on any particular row. One example is the "underlying logical grid method". These systems have left and right navigation effects on the system state which are not the inverse of each other (for example, asymmetries of type 1 as defined above). Such approaches attempt to ignore the irregularities inherent in the EPG data. They therefore suffer from anomalies due to mismatches between the data and the logical grid, as well as inefficiencies when programs exceed the logical grid size, requiring the user to issue excessive and unnecessary input commands.

Hybrid systems exist wherein the active program is indicated by a two-dimensional highlight of the entire portion of the program cell that is visible in the current window, but the navigation policies are different for motion occurring only within the visible window and motion that causes the visible window to move. An example is the EPG used in some PVR systems, wherein the response to a horizontal navigation command is always to move the active program indicator to the following or previous program, if that program is visible in the current window. However, motion of the visible window is globally restricted to increments of 30 minutes in response to each input command. Thus if the adjacent program is not visible in the current window, the system moves the visible window by 30 minutes in the appropriate direction, and highlights the first program made visible on the currently active channel in the new window, whether or not it is different from the previous active program.

Regarding visible window scrolling, as distinct from motion of the active program indicator, prior art systems scroll the visible window in multiples of the grid column width, which is typically 30 minutes. The main difference between the horizontal window scrolling behaviors of previous systems is in whether or not they implement a predetermined global limit to scroll only one grid column width at a time. In systems that do allow visible window scrolling of more than one column width, the amount of scrolling is determined by the duration and start time of the active program on the active grid row, without regard to the EPG data on other grid rows.

An example of the behavior of methods that use a predetermined global limit on visible window scrolling (typically 30 minutes in response to each horizontal movement command) can be seen by referring to FIG. 43. Starting from this initial state, methods placing a global limit on horizontal scrolling would typically respond to a "move right" command by moving the active program indicator to the "Rawhead Rex" program cell, highlighting the first 60 minutes of the program and leaving the position of the visible window unchanged. From that state, four additional "move right" commands would be required to move the visible window's starting position to 5.00 pm, 5.30 pm, 6.00 pm, and then 6.30 pm in order to leave the system in the state shown in FIG. 44.

Turning now to the second class of EPG systems found in the prior art, wherein horizontal motion of the active program indicator is calculated from the start times and durations of programs on the currently active grid row; we refer herein to this class of navigation methods as "row-based". Of these methods, the least complex and most efficient for the user may be the recently developed point-based method [ref]. However, even the point-based method suffers from problems that are inherent in the row-based approach to navigation of EPG data represented in grid form.

For all row-based methods, the response to a "move left" or "move right" command may be different depending upon which grid row is currently active, and this leads to non-commutativity of vertical and horizontal motion. The consequence for the user is that there are often situations where scrolling right on one row takes the user past the end of an interesting program on another row, thereby requiring leftward scrolling in order to reach the desired new program. Similarly, it may often be the case that in response to a single "move left" command the system takes the user past the beginning of a program that is of interest to the user, thereby requiring a "move right" command to see the relevant supplementary information. For example, according an embodiment of to the "point-based" method which uses an information line to indicate the active point in time, the response to a single "move left" command from the system state shown in FIG. 19 is the system state shown in FIG. 18. The user might start from the initial state of FIG. 19 and be interested in one of the programs not intersected by the information line in either FIG. 19 or FIG. 18 (for example the programs starting at 5.00pm "Hi Tech Today" on QVC 67, "The O'Reilly Factor" on FNC 69, "Creation Records . . . " on Ovation 70, etc.). In this case, after issuing a single "move left" command, it would be necessary to then issue one or more "move up" or "move down" commands, as well as one or more "move right" commands, in order to see supplementary program information for the desired program. In general there will be many different command sequences that may be used to move the active program indicator from one program cell to another. The more often these command sequences include horizontal "backtracking" (i.e. the inclusion of a "move left" command in a sequence of vertical commands and "move right" commands, or the inclusion of a "move right" command in a sequence of vertical and "move left" commands), the more likely it is that asymmetries of left and right motion will cause unnecessary confusion. Thus the absence of commutativity in horizontal and vertical motion exacerbates the problems caused by left/right asymmetry.

Similar problems occur with other variants of row-based horizontal navigation. FIGS. 35 through 42 all derive from the same actually occurring EPG data, for a set of "user favorite" channels. Starting from an initial system state as shown in FIG. 42, since the "Public Affairs" program on CSPAN 42 lasts from 10.00am till 3.15pm, row-based navigation methods that do not have a global constraint on window scrolling would typically move the active program indicator at least five hours in response to a single "move right" command. This would cause the user to miss information for a very large number of programs at intermediate times on other grid rows.

There is therefore a need for a system, which provides smooth, efficient, error-tolerant EPG grid navigation, without the drawbacks found in prior art systems. The required properties of this new navigation method are that horizontal and vertical motion should be commutative, thereby not only increasing the equivalent navigation options in navigating to a particular grid cell, but also ensuring that the response to a "move left" or "move right" command will be the same regardless of which grid row is active. However, the navigation policy should be responsive to the particular sizes and positions of the cells in each successive visible window onto the EPG grid, so that excessive and unnecessary user inputs are not required, and anomalies do not occur as a result of widely varying program start times and durations. The horizontal navigation method should support swift and efficient comparison of programs at a single time, motion to a different time, and comparison of programs at those times, without requiring backtracking to navigate to all data, and in a manner that enables easy recovery from erroneous input. The present invention satisfies these needs, as well as others, and overcomes the deficiencies found in existing systems.

SUMMARY OF INVENTION

According the method of the present invention, the system's responses to user input commands requesting horizontal grid motion are calculated by a novel method that takes into account the times and durations of programs on all rows currently displayed in the grid. Since the calculation used by this method produces an identical result for all rows currently displayed in a grid, horizontal motion in response to "move left" or "move right" commands from the user is identical regardless of which grid row is currently active. This equivalence of horizontal motion on all displayed rows guarantees the desired commutativity of horizontal and vertical motion within the displayed grid. The term "grid-based" is used herein for this type of navigation, because it relies on the EPG data appearing in the entire displayed grid, not on data from just a portion of the grid (such as the data on a single row), or on some factor independent of the actual EPG data shown in the grid (such as a globally invariant "logical cell size" or predetermined constant value). The invention may be applied in different ways to improve existing EPG systems, depending upon the methods that those systems use for visually indicating the currently active program.

A first example application of the present invention is in "point-based" EPG systems, which use an information line (or other graphical means) to indicate the currently active program. The present invention provides an improved method of navigation for point-based EPG grids wherein the requirement for users to "backtrack" while navigating from one cell to another is eliminated. Using the navigation method of the present invention, each program cell is easily accessible from all others by a variety of routes without requiring the user to move first in one direction and then in the opposite direction.

A second example application of the invention is in systems that use two-dimensional cell highlighting to indicate the active program. In this case, the use of the grid-based method is limited to the control of visible window scrolling. In such systems, the motion of the active program indicator within the visible window is, by definition, different on each row. That difference is a result of the differences in the two-dimensional highlights of the program cells on each row, which in turn are a result of the different start times and durations of the TV programs. However, motion of the visible window with respect to the EPG data is, by definition, equivalent to a motion of all rows of the grid simultaneously by the same amount. It is therefore possible to apply a grid-based method according to the present invention to control the motion of the visible window, in order to improve a variety of traditional EPG systems. The novel method takes into account the data on all rows of the grid in determining the appropriate amount of visible window motion in response to each horizontal motion command.

BRIEF DESCRIPTION OF DRAWINGS

FIG. 4 is a diagrammatic representation of an EPG according to the "line-based" method of the prior art.

FIG. 5 is a diagrammatic representation of another EPG according to the line-based method of the prior art.

FIG. 6 is a diagrammatic representation of an EPG, wherein the data illustrates the result of a "move left" command from an initial state as in FIG. 4 or 5 according to the "line-based" method of the prior art.

FIG. 7 is a diagrammatic representation of an EPG, wherein the data illustrates the same position of the information line as in FIG. 4, but with the visible window showing an earlier grid displayed period.

FIG. 8 is a diagrammatic representation of an EPG, wherein the data illustrates the result of a "move left" command from an initial state as in FIG. 7 according to the "line-based" method of the prior art.

FIG. 9 is a diagrammatic representation of an EPG according to the present invention, wherein the data illustrates the customized channel lineup of FIG. 39 at another still later grid displayed period.

FIG. 10 is a diagrammatic representation of an EPG according to the present invention, wherein the data illustrates the customized channel lineup of FIG. 39 at a later grid displayed period.

FIG. 11 is a diagrammatic representation of an EPG, wherein the data illustrates a problematic case for the simplest embodiment of the present invention.

FIG. 12 is a diagrammatic representation of an EPG according to the present invention, wherein the data illustrates a possible result of a "move right" command from the initial state of FIG. 17.

FIG. 14 is a diagrammatic representation of an EPG according to the present invention, annotated to show points of new information and points of information loss used in deriving a "move right" command.

FIG. 15 is a diagrammatic representation of an EPG according to the present invention, annotated to show points of new information and points of information loss used in deriving a "move right" command, wherein the information line is at a later initial position than in FIG. 14.

FIG. 16 is a diagrammatic representation of an EPG according to the present invention, annotated to show points of new information and points of information loss used in deriving a "move right" command, wherein the information line is at a later initial position than in FIG. 15.

FIG. 17 is a diagrammatic representation of an EPG according to the present invention, annotated to show points of new information and points of information loss used in deriving a move right command, wherein the information line is at a later initial position than in FIG. 16.

FIG. 19 is a diagrammatic representation of an EPG according to the present invention, annotated to show points of new information and points of information loss used in deriving a "move left" command.

FIG. 20 is a diagrammatic representation of an EPG according to the present invention, annotated to show points of new information and points of information loss used in deriving a "move left" command, wherein the information line is at an earlier initial position than in FIG. 19.

FIG. 21 is a diagrammatic representation of an EPG according to the present invention, annotated to show points of new information and points of information loss used in deriving a "move left" command, wherein the information line is at an earlier initial position than in FIG. 20.

FIG. 22 is a diagrammatic representation of an EPG according to the present invention, annotated to show points of new information and points of information loss used in deriving a "move left" command, wherein the information line is at an earlier initial position than in FIG. 21.

FIG. 23 is a diagrammatic representation of another EPG according to the present invention, wherein the data illustrates a customized channel lineup.

FIG. 24 is a diagrammatic representation of an EPG according to the present invention, wherein the data illustrates a possible result of a "move right" command from the initial state of FIG. 23.

FIG. 25 is a diagrammatic representation of an EPG according to the present invention, wherein the data illustrates a possible result of a "move right" command from the initial state of FIG. 24.

FIG. 26 is a diagrammatic representation of an EPG according to the present invention, wherein the data illustrates the data that occurs on the same channels as FIGS. 23–25, at a later time period.

FIG. 27 is a diagrammatic representation of an EPG according to the present invention, wherein the data illustrates a possible result of a "move right" command from the initial state of FIG. 25.

FIG. 28 is a diagrammatic representation of an EPG according to the present invention, wherein the data illustrates the data that occurs on the same channels as FIGS. 23–27, at a later time period.

FIG. 29 is a diagrammatic representation of an EPG according to the present invention, wherein the data illustrates a possible result of a "move right" command from the initial state of FIG. 27.

FIG. 30 is a diagrammatic representation of an EPG according to the present invention, wherein the data illustrates a possible state in a sequence of "move left" commands from the initial state of FIG. 29.

FIG. 34 is a diagrammatic representation of an EPG according to the prior art.

FIG. 35 is a diagrammatic representation of an EPG, wherein the data illustrates a possible result of a "move right" command from an initial state as in FIG. 34 according to the prior art.

FIG. 36 is a diagrammatic representation of an EPG, wherein the data illustrates a possible result of a "move left" command from an initial state as in FIG. 35 according to the prior art.

FIG. 37 is a diagrammatic representation of an EPG according to the fourth embodiment of the present invention.

FIG. 38 is a diagrammatic representation of an EPG according to the fourth embodiment of the present invention, wherein the data illustrates a possible result of a "move right" command from the initial state of FIG. 37.

FIG. 39 is a diagrammatic representation of an EPG according to the present invention, wherein the data illustrates a customized channel lineup.

FIG. 40 is a diagrammatic representation of an EPG, wherein the data illustrates an alternative possible result of a "move left" command from an initial state as in FIG. 35 according to the prior art.

FIG. 41 is a diagrammatic representation of an EPG, wherein the data illustrates a possible result of a "move left" command from an initial state as in FIG. 7 according to one embodiment of the present invention.

FIG. 42 is a diagrammatic representation of an EPG, wherein the data illustrates an initial state according to one embodiment of the present invention.

FIG. 43 is a diagrammatic representation of an EPG, wherein a possible result of a use of a predetermined global limit on visible window scrolling according to one embodiment of the present invention.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
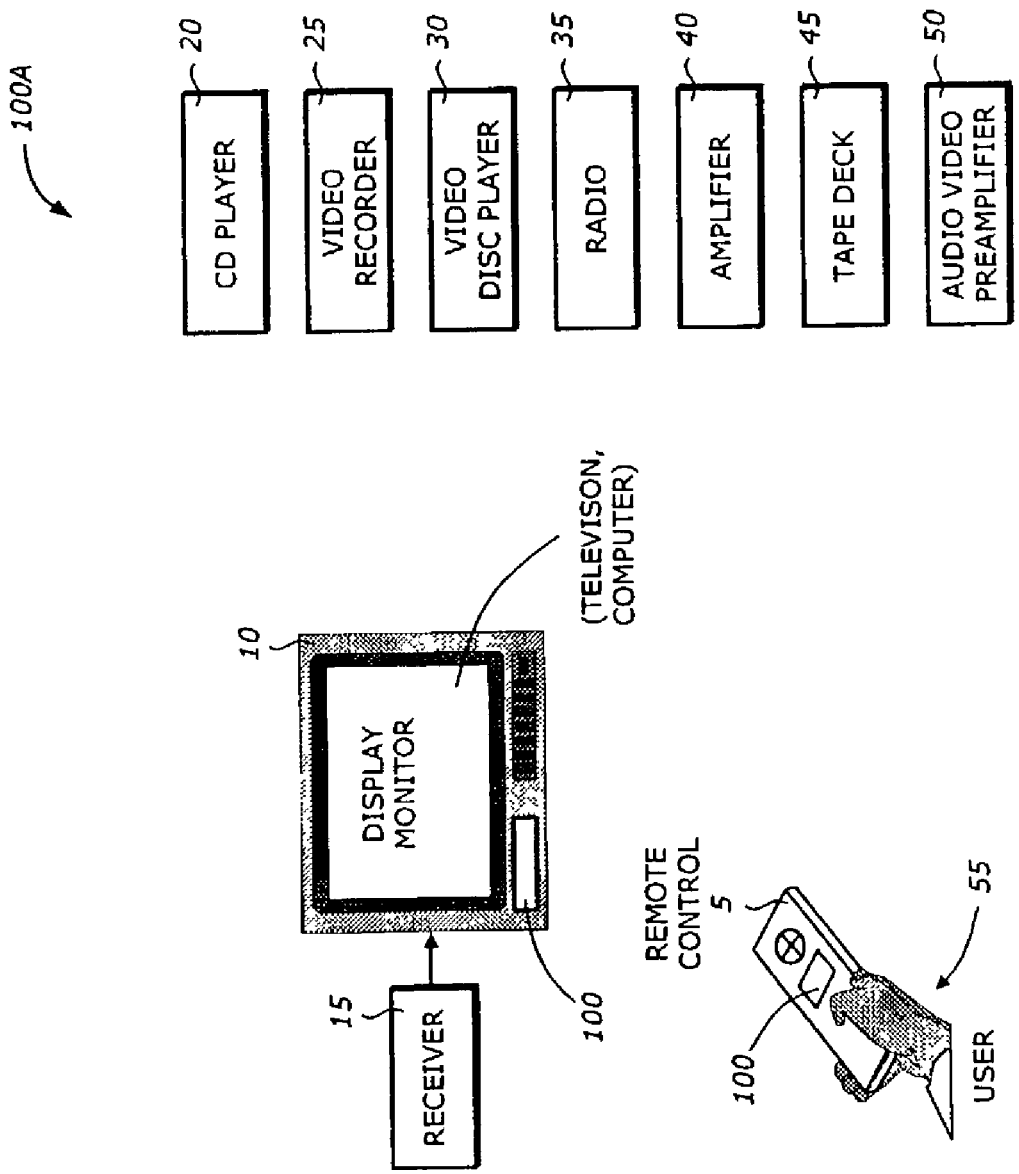
FIG. 1A is a block diagram illustrating one embodiment of an entertainment system in accordance with the teachings of the present invention.

FIG. 1A is a diagram illustrating an entertainment system 100A in which one embodiment of the invention can be practiced. The entertainment system 100A includes a remote controller 5, a television 10, a receiver 15 (i.e., DSS or satellite receiver), a CD player 20, a video recorder 25, a video disc player 30, a radio/a radio tuner 35, an amplifier 40, a tape deck 45, an audio video preamplifier 50 or a combination thereof. The receiver 15 may stand-alone or may be embedded inside the television 10. The remote controller 5 is adapted for use with a variety of electronic device. The user 55 uses the remote controller 5 to control these electronic devices in the entertainment system 100A. The remote controller 5 may take many forms, such as stand-alone unit, or part of a communication device. The remote controller 5 may be a handheld device that includes a screen to display information, a wireless keyboard, and wireless pointing devices for controlling the electronic devices. The communication between devices in the entertainment system 100A may be via cable (i.e., video, IR, serial, etc.) or wireless technology. It is contemplated that the remote controller 5 may be used with any system adapted to transmit, receive, or process remote controller messages in response to a user input.

Figure 1B:
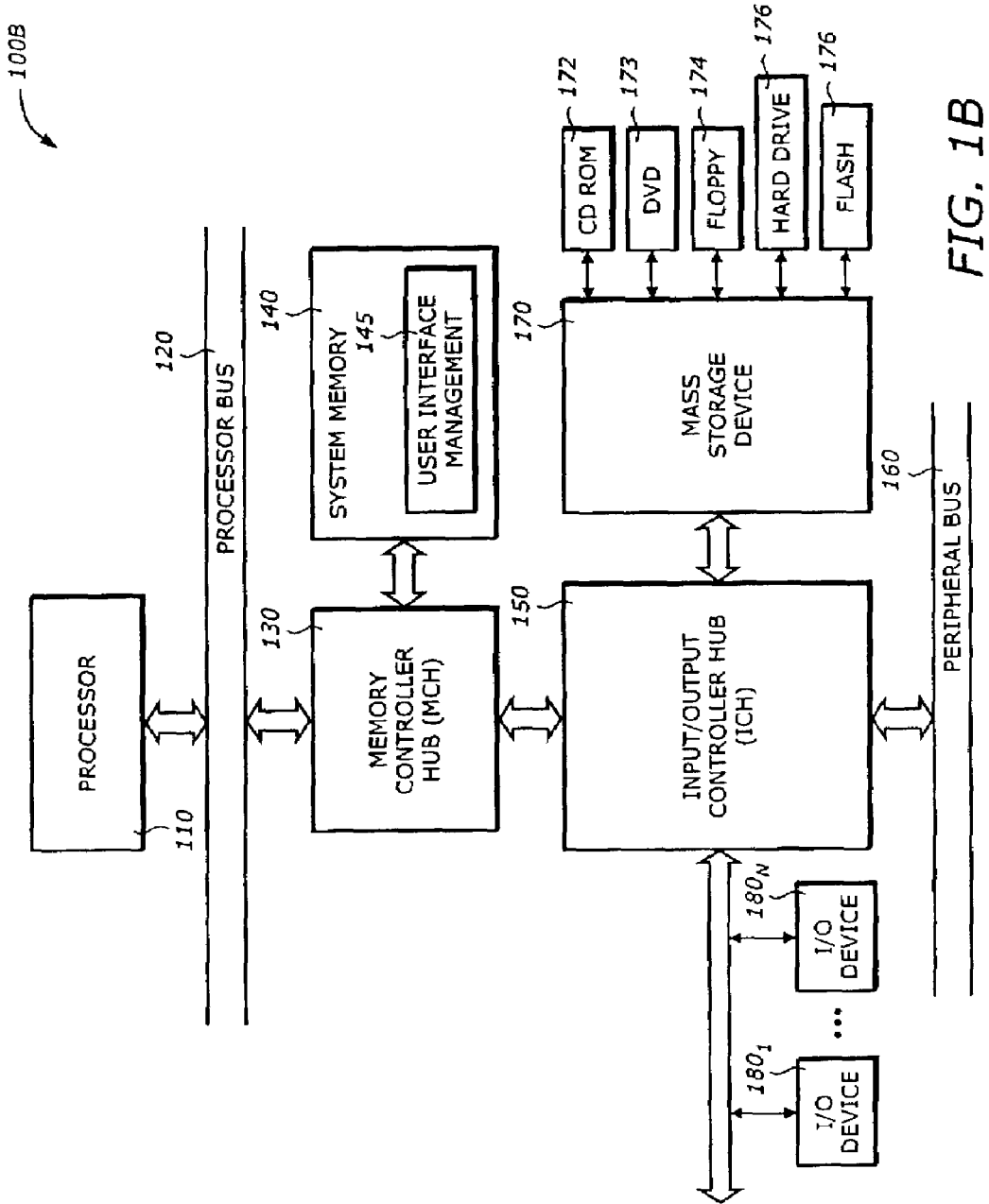
FIG. 1B is a block diagram illustrating one embodiment of a computer system in accordance with the teachings of the present invention.

FIG. 1B is a diagram illustrating a processor system 100B in which one embodiment of the invention can be practiced. The processor system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the processor system 100 may include more or less elements than these elements. The processor system 100 or a much less scaled version of it is contained in a receiver (i.e., TV, computer, etc.) or a remote controller 5, or any combination thereof. It is noted that the remote controller may be radio or Bluetooth device, or laser, etc.

The processor 110 represents a central processing unit of any type of such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices, the system memory 140, and the ICH 150. The MCH 130 may be integrated into a chipset that integrates multiple functionalities such as the isolated execution mode, host-to-peripheral bus interface, and memory control. The MCH 130 interfaces to the peripheral bus 160. For clarity, not all the peripheral buses are shown. It is contemplated that the system 140 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may include program code or code segments implementing one embodiment of the invention. The system memory includes a user interface management 145. Any one of the elements of the user interface management 145 may be implemented by hardware, software, firmware, microcode, or any combination thereof. The system memory 140 may also include other programs or data, which are not shown, such as an operating system. The user interface management 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers. Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

1. Description of Invention in a First Example Application

A first application of the invention is to improve "point-based" EPG systems. In the following description, a detailed example is given for a system using an information line, but the invention may be similarly applied to point-based systems, which use other graphical means to indicate the active program. For such systems the new method of calculating "grid-based" horizontal motion is as follows. There is no predetermined maximum or minimum amount that the information line is moved in response to each "move left" or "move right" command. The amount of motion is calculated from the times and durations of programs in the displayed grid rows in such a way that:

1. When moving right the information line does not move so far that it moves past the end of a program cell (on any grid row) which is not currently intersected by the information line, and 2. When moving left the information line does not move so far that it moves past the beginning of a program cell (on any grid row) which is not currently intersected by the information line These two properties of the navigation method ensure, for right and left motion respectively, that program information for each program in the grid is easily accessible from every other point in the grid. Since no horizontal input command can move the information line past a program which is not currently accessible by vertical motion alone, all cells will be accessible by a combination of horizontal and vertical motion which does not include "backtracking". This is because when moving right, backtracking would only be required if the information line moved past the end of a program cell which was not accessible by vertical motion alone from the initial state. Correspondingly, when moving left, backtracking would only be required if the information line moved past (both the end and) the beginning of a cell which was not accessible by vertical motion alone from the initial state.

Figure 18:
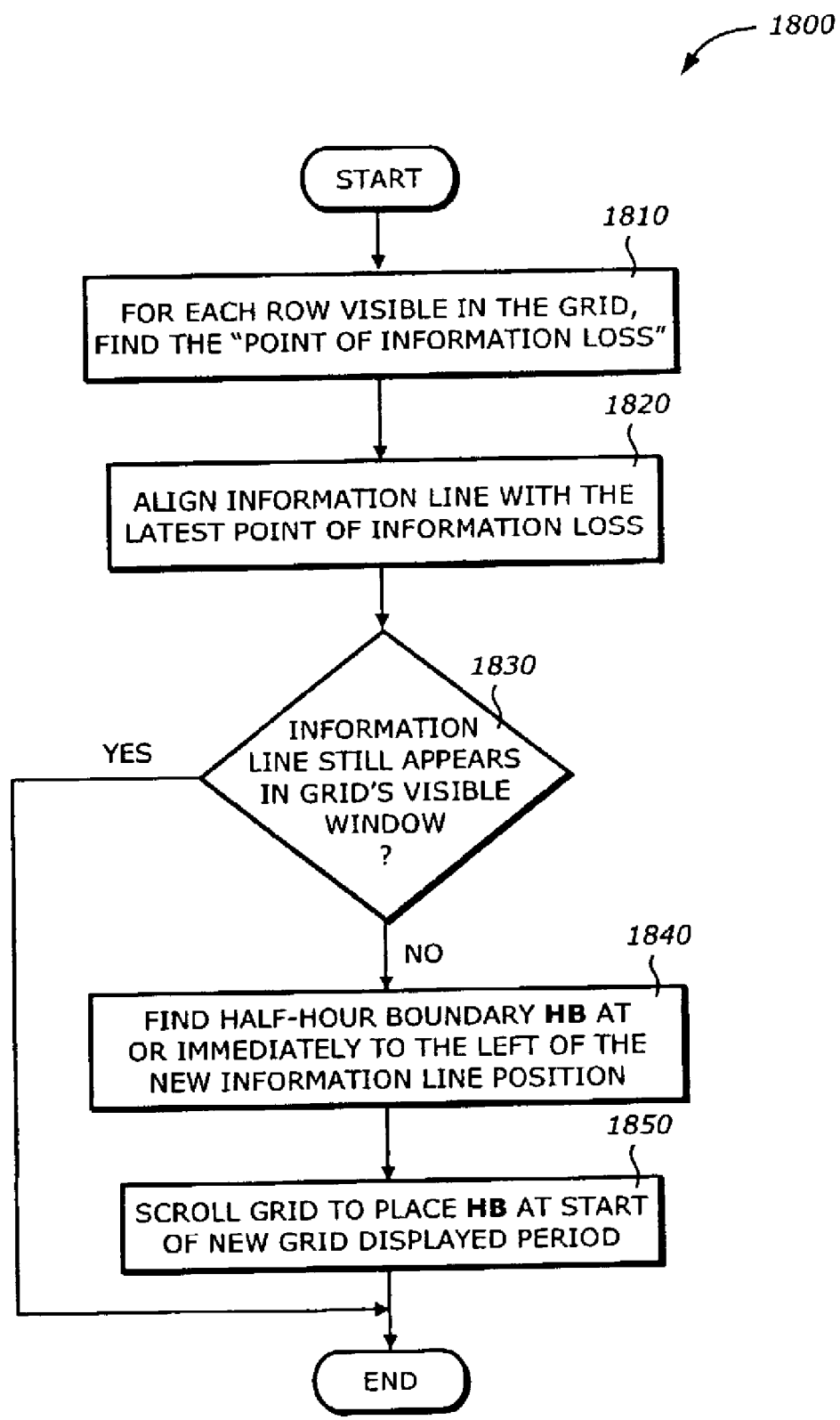
FIG. 18 is a flowchart for determining how to move the information line in response to a "move left" user input command in accordance with the second embodiment of the present invention.

By eliminating the need for backtracking, this method greatly reduces the user confusion associated with asymmetrical horizontal motion as noted previously. For example, it was shown previously how an embodiment of the "point-based" method could respond to a "move left" command from an initial system state as shown in FIG. 19 by moving the information line to 4.30pm, as shown in FIG. 18. This would move it past many programs with start times beginning at 5pm or later. Those programs would not therefore be accessible without a subsequent "move right" command. In contrast, the grid-based method described below responds to a "move left" input from an initial state shown in FIG. 19 by moving leftwards only to 6.00pm, which corresponds to the beginning of the 6.00->6.30pm episode of "Dexter's Laboratory" on TOONP 63.

Furthermore, when taken together with the commutativity property, the above properties of the method also ensure that there are always multiple ways to get from a system state in which a first program is active to a system state in which a second program on another row is active, and that none of these ways requires the user to backtrack. As an illustration, one may consider the case where the user wants to move to a program cell one row below the currently active row and immediately to the right of a program currently intersected by the information line. The new method ensures that it is possible to have sequences of user input commands such as "right, down" or "down, right" which are equivalent, in the sense of leaving the system in an identical state. Furthermore, there will always be many such equivalent sequences between every pair of program cells on the currently displayed grid rows, whenever the target cell is both on a different grid row to the currently active grid cell, and also not currently intersected by the information line.

The method therefore increases the number of equivalent sequences of user input commands that can be used to achieve the same EPG navigation goal, leaving the system in exactly the same state with respect to the positions of the information line and visible window. The present invention thereby greatly improves the chances that the user can easily navigate to an arbitrary program in the grid without problems of asymmetry causing the need to recover from an unintended system state. Some left/right asymmetries, for example those previously defined as type 1 asymmetries, are an inevitable consequence of using one set of input commands to control two different types of motion. However, the novel navigation method eliminates the requirement that left and right motions ever need to be combined in order to achieve any given navigation of the active program indicator from one program cell to another. The present invention thereby eliminates the circumstances under which many of the confusing effects of asymmetry and non-commutativity arise.

However, there are still some circumstances under which the need for backtracking is inevitable. This occurs when a user issues an unintended or erroneous input command. In such cases, there is potential for user confusion if asymmetries in horizontal motion cause the system to end up in a state substantially different from the initial state after merely issuing a "move right" command followed by a "move or vice versa. Accordingly, the present invention provides for a variety of alternative embodiments, each of which has only minor asymmetries in horizontal motion.

According to a first embodiment, the system's methods of responding to horizontal motion commands provide maximal symmetry, at the expense of efficiency in navigating some configurations of EPG data. This embodiment employs a simple navigation method, which always moves the information line to the nearest program boundary that occurs on any row of the grid in the specified direction of motion.

According to a second embodiment, the system's responses maximize the efficiency of navigation in the general case, at the expense of some asymmetry when navigating some unusual configurations of EPG data. The system analyses the information on all rows visible in the grid, to determine a point in the grid from which "horizontally new" program information is accessible. In this context, "horizontally new" information is supplementary information for programs, which are not currently intersected by the information line. That is because for all programs, which are intersected by the information line in the initial state, their supplementary program information is accessible by vertical scrolling alone. Therefore as used herein, "horizontally new" information is information that cannot be accessed except by using horizontal scrolling, optionally also in combination with vertical scrolling. From each starting point of the information line, there are many different points from which "horizontally new" program information is accessible. The method of the example second embodiment adds a third property to the general grid-based navigation method described previously, as follows:

3. When moving in either direction, the information line always moves at least far enough to intersect a program cell on at least one row displayed in the grid (not necessarily the currently active grid row) which is not intersected by the information line in the initial state This property of the navigation method ensures that horizontal motion over the grid, as a whole is efficient from an information-theoretic point of view. It is never necessary for the user to issue more than one command in order to move the information line to a place from which "horizontally new" information for at least one program is available by vertical motion alone. This is true regardless of the durations or start times of the programs in the grid rows (and thus, as described below, can lead to information line movements corresponding to several hours in response to a single command, in the context of some types of EPG data). The navigation method of this second embodiment of the invention thus always moves the information line as far as possible in the specified direction of motion, whilst remaining within the first two constraints of the general method, which ensure that backtracking, is unnecessary.

According to a third embodiment of the invention, as applied to point-based EPG systems, limits may be placed upon the scrolling motion of the visible window. This provides additional reassurance to the user that no program information has been overlooked while navigating through the data.

These three embodiments are described further in the following sections.

1.1 First Embodiment of the Invention: Maximal Symmetry

This first embodiment of the new invention is an improvement on the navigation methods used in previous "point-based" systems. It provides the greatest possible left/right symmetry, ensuring that the information line will always be placed at exactly the same place with respect to the EPG data after any pair of horizontal moves in opposite directions. The amount of motion in each direction that the system provides, in response to each horizontal move command, depends upon the actual EPG data for the rows displayed in the current grid. There is no uniform, maximum or minimum amount of movement in each case. A period of time is chosen which corresponds to the width of one column of the grid, such that the grid's displayed period changes by multiples of this period of time. In the following discussion, a period of 30 minutes is chosen, so that movements of the visible window onto the data occur in multiples of 30 minutes, and start and end of the grid's displayed period align with a half-hour boundary. It should be understood, however, that other periods of time may be chosen without departing from the inventive concepts herein.

Figure 2:
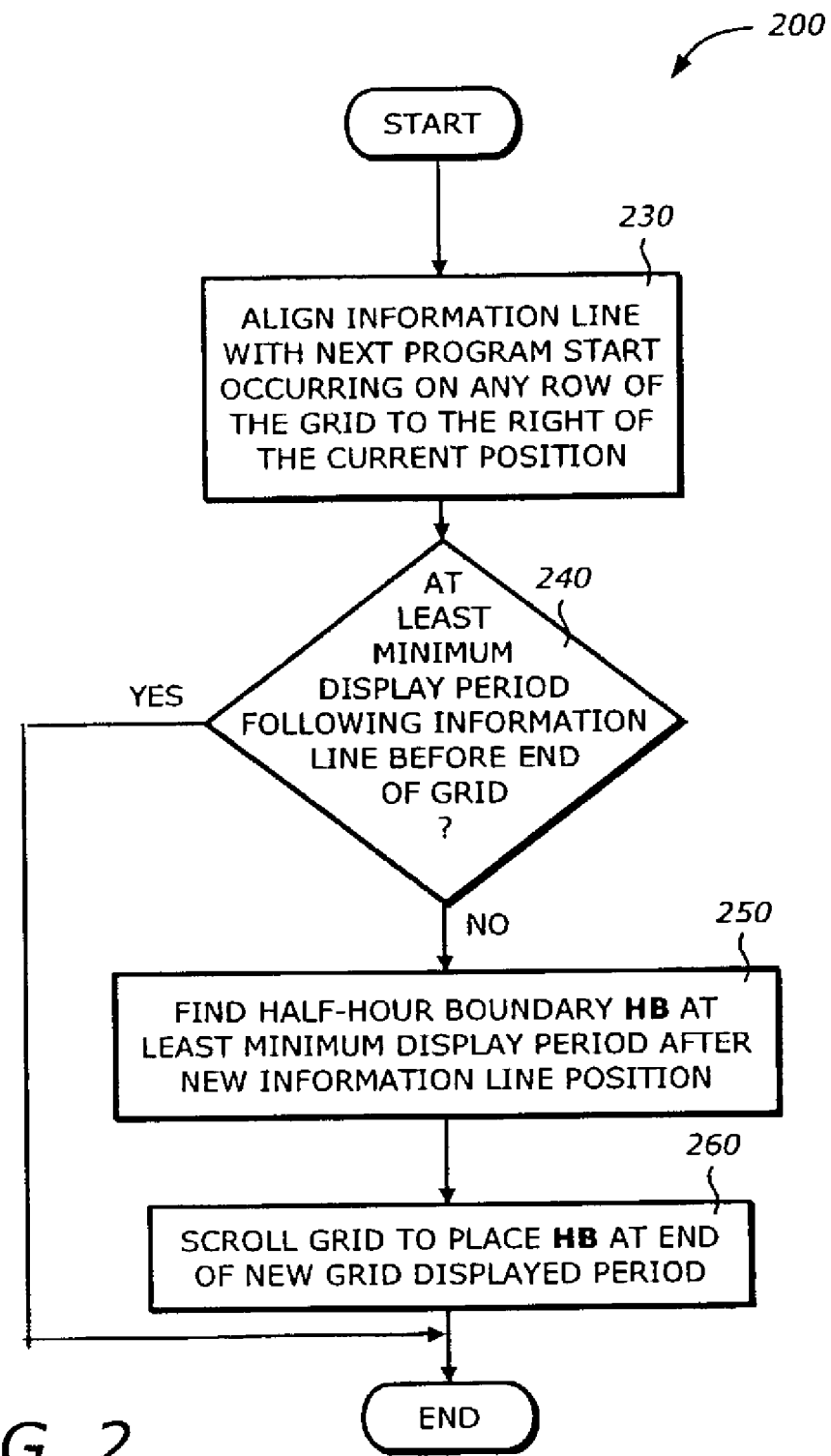
FIG. 2 is a flowchart for determining how to move the information line in response to a "move right" user input command in accordance with the first embodiment of the present invention.

FIG. 2 is a flow chart diagram illustrating a process 200 for calculating movements of the information line in response to a "move right" command according to the first embodiment of the invention. Upon START, the process (230) aligns information line with a next program start occurring on any row of the grid to the right of the current position. Next step (240), the process checks whether there is at least a minimum display period following the information line before the end of the grid. If yes, the process terminates. If no, the process continues to find a half-hour boundary HB at least minimum display period after the new information line position. The process at next step (260) scrolls the grid to place the HB at the end of the new grid displayed period. The process is then terminated.

In other words, the method for calculation the movements of the information line are shown in FIG. 2. If the user issues a "move right" command, the system first checks for the next program boundary to occur on each row of the grid to the right of the current information line position. These program boundaries may or may not occur within the current visible window of the grid. The first of these program boundaries corresponds to the earliest program start after the time represented by initial position of the information line. The system re-positions the information line to align with this program boundary, regardless of which grid row is currently active. A check is then made to determine whether the information line is still visible in the currently displayed grid, with at least a minimum display period between it and the end of the grid. This minimum displayed period may be, for example, 15 minutes, which with typical font sizes allows for the readability of at least enough text on the right of the information line to be helpful to the user in most cases. If this condition is met, no further action is taken. However, if the new position of the information line is either outside the currently visible grid window, or less than the minimum display period from the end of the currently visible window, the system scrolls the visible window. The system determines which 30 minute boundary is the first to occur at least the minimum display period after the new position of the information line. The visible window then scrolls to place that boundary at the end of the new grid displayed period.

The following examples illustrate how this method applies to some of the example grids shown in the figures, when responding to a "move right" command. Beginning from an initial state as shown in FIG. 4, the information line moves to a position corresponding to 5.30pm, to align with the beginning of the 5.30 episode of "Courage the Cowardly Dog" on TOONP 73. In this case, the movement corresponds to a 30 minute time period. The same response occurs regardless of which row of the grid is currently active. Starting from an initial state as shown in FIG. 39, the information line will move to a position corresponding to 7.15pm, aligning with the start of "The Hand That Rocks the Cradle". Here the amount of movement corresponds to only 15 minutes. Once again, the same response occurs regardless of which grid row is active. If the initial state is as shown in FIG. 10, regardless of which grid row is active, the information line will re-position to 9.30pm, to align with the beginning of three new programs "Guarding Tess", "Sheena" and "The Buddy Holly Story" (which can be seen in FIG. 9). Here the movement corresponds to a period of 90 minutes, and the system also moves the visible window by 30 minutes to show a new grid displayed time period of 8.30pm to 10.00pm. The new position of the visible window leaves the new position of the information line at the start of the third column of the grid.

Figure 3:
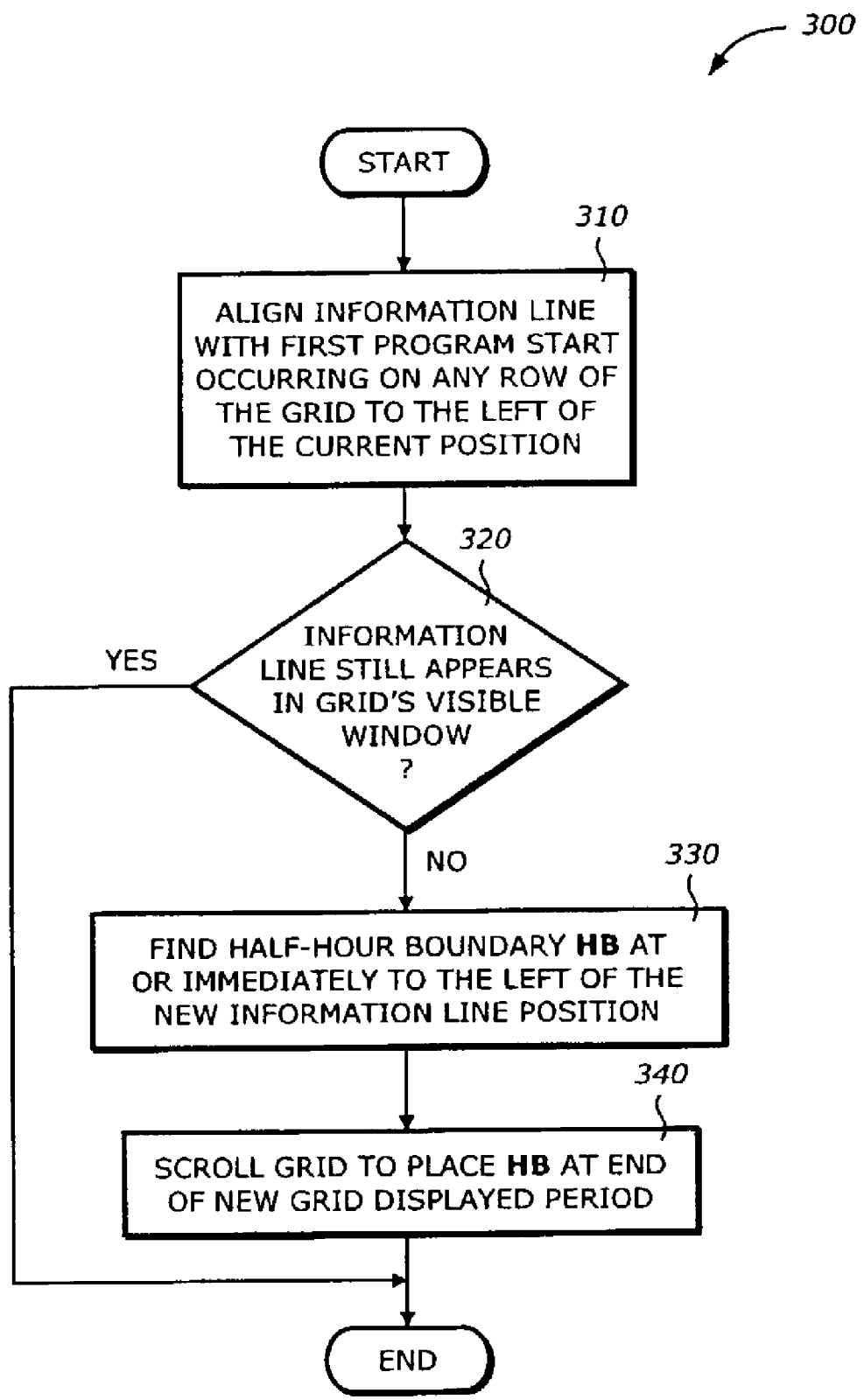
FIG. 3 is a flowchart for determining how to move the information line in response to a "move left" user input command in accordance with the first embodiment of the present invention.

FIG. 3 is a flow chart diagram illustrating a process 300 for calculating movements of the information line in response to a "move left" command according to the first embodiment of the invention. Upon START, the process (330) aligns the information line with the first program start occurring on any row of the grid to the left of the current position. Next step (340), the process checks whether the information line still appears in the grid's visible window. If yes, the process terminates. If no, the process (350) continues to find a 30-minute boundary HB at or immediately to the left of the new information line position. The process at next step (360) scrolls the grid to place the HB at the end of the new grid displayed period. The process is then terminated.

In other words, the method for calculating movements of the information line in response to a "move left" command is shown in FIG. 3. The system first checks for the latest program boundary to occur on each row of the grid to the left of the current information line position. These program boundaries may or may not occur within the current visible window of the grid. The first of these program boundaries (moving leftwards) corresponds to the latest program start before the time represented by the initial position of the information line. The system re-positions the information line to align with this program boundary, regardless of which grid row is currently active. A check is then made to determine whether the information line is still visible in the currently displayed grid. If this condition is met, no further action is taken. However, if the new position of the information line is outside the currently visible grid, the system scrolls the visible window. The system finds the first 30-minute boundary, which is either at or immediately preceding the new position of the information line. The visible window then scrolls to place that boundary at the start of the new grid displayed period.

Turning now to examples of how this "move left" method applies to some example grids. Starting from an initial state as shown in FIG. 7, the method repositions the information line to 4.30pm as shown in FIG. 41. As with responses to "move right" commands, the amount of horizontal motion of the information line in response to "move left" commands according to the grid-based method is the same regardless of which grid row is currently active. There is also no predetermined minimum or maximum amount of movement. Thus if the initial system state were similar to that shown in FIG. 9, but with the information line at 9.30pm, then the new position would be at 8.00pm, as shown in FIG. 10.

The methods of this first embodiment always produce left/right movement that is completely symmetrical with respect to the position of the information line relative to the EPG data. This is true regardless of the amounts of movement of the information line from different initial positions, and regardless of the start times and durations of any possible EPG data. It is as if, for each program on each row in an EPG grid, lines were drawn extending from the program start up and down through all the other rows that are visible in the grid. Many of these lines would overlap and be indistinguishable from each other, in cases where programs on different rows start at the same time. Furthermore, these lines may be thought of as having been drawn through all the rows visible in the grid, even at times that are not currently visible in the grid. In effect, these "virtual" lines would exactly represent all the possible positions of the information line with respect to those rows of EPG data. The methods shown in FIGS. 2 and 3 guarantee that, in response to each "move left" and "move right" command, the information moves from being aligned with one of these "virtual lines" to being aligned with the immediately adjacent "virtual line". No positions of the information line are possible, other than those that match the "virtual lines". Therefore in general any horizontal movement command moves the information line from a position that aligns with "virtual line n" to a position that aligns with the immediately adjacent "virtual line m". It is therefore necessarily the case that an immediately succeeding command, requesting horizontal movement in the opposite direction, moves the information line back again to align with "virtual line n". The actual "distance" between each pair of virtual lines (which determines the time period corresponding to the information line movement) depends only upon the start times of programs that occur on a given set of grid rows. Thus this first embodiment of the new invention has no asymmetries of types 2, 3 or 4, as defined earlier.

This first embodiment of the grid-based method therefore provides the maximum possible symmetry of left/right motion, in addition to providing the commutativity of horizontal and vertical motion provided by the basic method. Therefore not only is there a reduction of the occurrence of the conditions that tend to give rise to user errors, as compared with prior art methods. There is also an increased likelihood that if the user does make an error in horizontal navigation, it can easily be "undone" by simply issuing a single command to move in the opposite direction from the previous (erroneous) direction.

1.2 Second Embodiment of the Invention: Maximal Efficiency

The second embodiment is motivated by an information-theoretic analysis of the data accessible from each horizontal position of the information line. Although the first embodiment described herein is the simplest, and provides easy, reliable navigation no matter what the start times and durations of TV programs appearing in the grid, there are some circumstances under which the navigation methods shown in FIGS. 2 and 3 give rise to inefficiencies in grid navigation. The second embodiment, which also applies to point-based EPG systems, eliminates these inefficiencies at the expense of adding slightly more asymmetry in horizontal motion.

A problem with the simplest embodiment of the new invention is that it occasionally requires more inputs to move an information line from one end of a grid to another than are strictly required in order to be able to access all the information in the grid. FIG. 11 illustrates a "worst case scenario" for the simplest embodiment of the grid-based approach. Starting from this initial state, it requires no less than eight "move right" commands to move the information line to 3.15pm, aligning with the start of the 3.15 episode of "Rugrats". This is because the movement of the information line according to FIG. 2 is as follows, regardless of which grid row is active. In response to the first command, it moves to 2.25 to align with the start of "Backstory". In response to the second command, it only moves another 5 minutes, to align with the start of the 2.30 episode of "Rock Power". In response to the third command, it moves another 5 minutes to align with the start of the 2.35 episode of "Rick Steves Europe". The fourth command causes alignment with the start of the 2.45 episode of "Rock Power". The fifth command positions the information line at 2.55, aligned with the start of "Raiders of the Lost Ark". Command six moves it to 3.00pm, and command seven moves it to 3.10pm, aligning with the start of the 3.10 episode of "R. Steves Europe". The eighth command moves the information line another five minutes to 3.15pm.

Such inefficiencies in the simplest embodiment of the invention occur rarely, and are a result of situations where, in a single grid, there are a relatively large number of program start times that are not aligned with each other on the different rows. Those situations are most likely to occur when there are a large number of short programs in the grid, and when several different grid rows contain programs whose start times are not aligned with half-hour boundaries.

Since a large majority of TV programs are typically aligned with half-hour boundaries, the problematic situations do not arise frequently.

However, grids such as that shown in FIG. 11 do occur, and the first embodiment of the invention is clearly inefficient in these cases. The main goal of the grid-based invention is to make it as easy as possible to browse through all the program information in an intuitively easy way. A natural method of covering all programs in a given set of grid rows (particularly in the context of choosing programs to watch "now" or "soon") is to compare all the programs on the different rows at a first time, then to move to a subsequent time and compare those programs, etc. The second embodiment of the grid-based approach facilitates this by providing as many "stopping points" in the horizontal motion as are necessary to scroll vertically to see the supplementary information on the other (currently non-active) grid rows. However, by constraining the horizontal motion to stop at the start of every program, the first embodiment of the grid-based method makes more stops than are logically necessary. This is because, in systems which use an information line to indicate the active program, supplementary information for each program can be seen when the information line intersects the program cell at any point during the program's duration, not just at the program's start. Therefore as long as the horizontal motion of the information line in response to each "move right" input command does not move past the end of a given program, its supplementary information will still be available by vertical scrolling without the need for backtracking, even though the motion does not stop at the beginning of the program.

As will be shown below, the second embodiment of the grid-based method moves from the initial state of FIG. 11 to the state of FIG. 12 in which the information line is at 3.15pm, after only four "move right" commands. This embodiment of the invention utilizes a navigation method that takes into account the accessibility of supplementary program information when the information line intersects a program cell at any point before its end. The improved navigation method moves the information line as far as possible in response to each input command, whilst still maintaining the following two properties. First, the information line does not move past a cell, which is not intersected in the initial state. Secondly, this embodiment ensures that the information line always aligns with the start of at least one program in the grid (this ensures the greatest possible symmetry in left/right movement given the requirements for greater efficiency).

Figure 13:
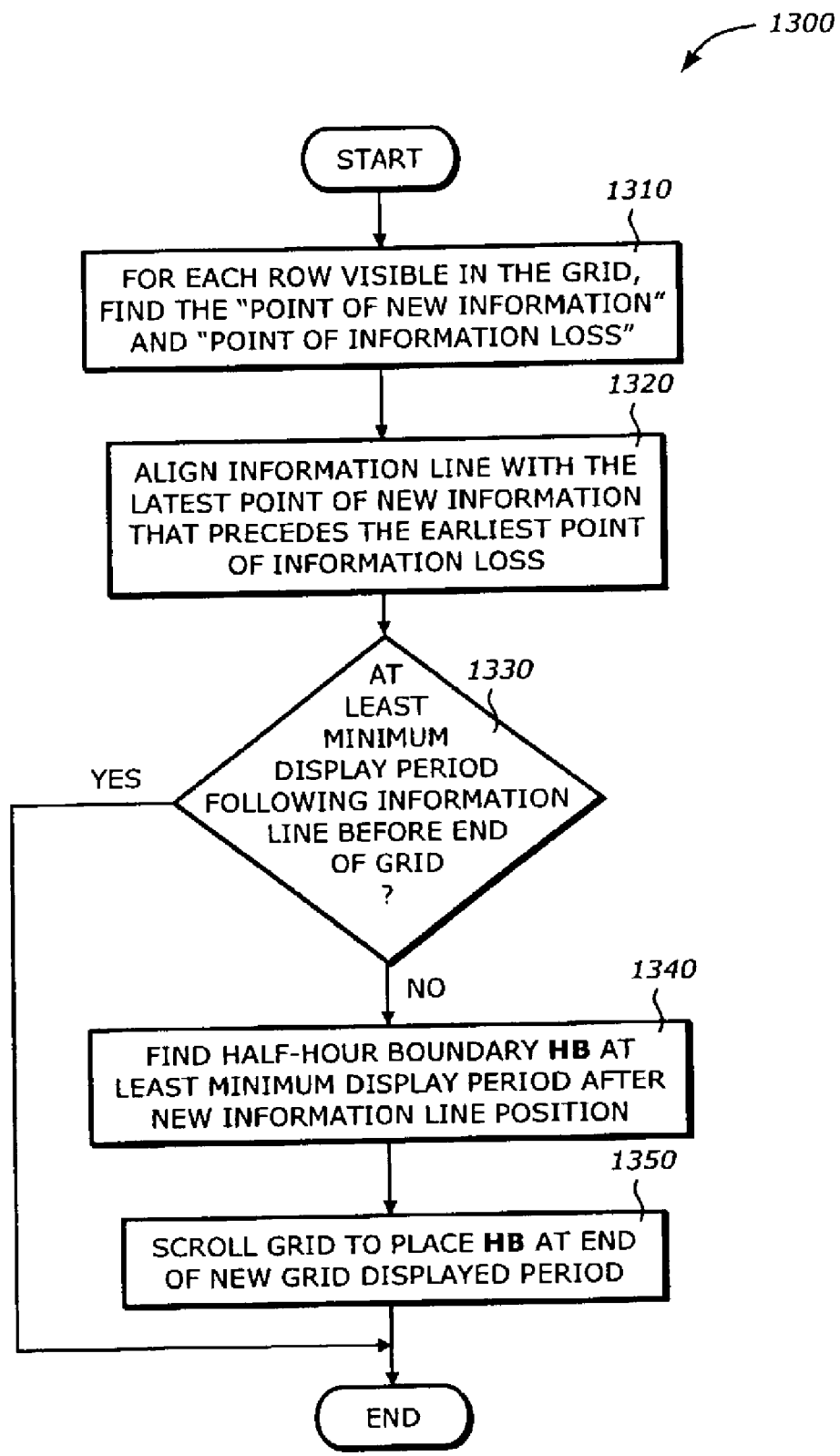
FIG. 13 is a flowchart for determining how to move the information line in response to a "move right" user input command in accordance with the second embodiment of the present invention.

FIG. 13 is a flow chart diagram illustrating a process 1300 for calculating movements of the information line in response to a "move right" command, according to the second embodiment of the invention. Upon START, the process (1330) finds a "point of new information" and "point of information loss" for each row visible in the grid. At the next step (1340), the process aligns the information line with the latest point of new information that precedes the earliest point of information loss. The process determines (1350) whether there is at least a minimum display period following the information line before the end of the grid. If yes, the process terminates. If no, the process (1360) continues to find a half hour boundary HB at least a minimum display period after the new information line position. The process at next step (1380) scrolls the grid to place the HB at the end of the new grid displayed period. The process is then terminated.

In other words, the calculation of the exact movement of the information line according to this second embodiment of the invention proceeds by finding, for each row visible in the grid, a "point of new information" and a "point of information loss". FIG. 13 illustrates this process as it applies to rightward motion. The "point of new information" on each grid row is the first point that is encountered, when moving rightwards direction, where the information line begins to intersect a different program from the one that was intersected on that row in the initial state. On each grid row the end of one program normally coincides with the start of another program, because gaps for advertising etc are ignored in the EPG data. Therefore, when moving rightwards, the point of new information on each grid row will be the start of the program immediately following the one that is intersected in the initial state. If there are N rows in the grid, the programs whose start corresponds to the point of new information for each row may be designated as newprog1, newprog2, . . . newprogN. For this process, it is not necessary that each newprogX be currently visible in the initial grid. The "point of information loss" on each row M of the grid corresponds to the end of newprogM. This is because, on row M, if rightwards motion from the initial state moved past the end of newprogM in response to a single input command, then the user would not be able to access supplementary program information for newprogM without using a "move left" command. That would constitute a "loss" of accessibility to program information during the movement of the information line that would violate the first property of the present method as noted previously.

Once the points of new information and information loss have been found for line, the system determines which is the earliest point of information loss to occur on any line of the grid. This is first point of information loss that would be encountered as the information line moves right, and may be described as the "point of information loss" for the grid as a whole. The system then determines which of all the points of new information is the last to occur before the grid's point of information loss. The information line is then aligned with this point. A check is then made for the visibility of the new position of the information line. If necessary, the grid's visible window is scrolled.

The method may be further understood by referring to some examples. From the initial state shown in FIG. 14, the points of new information for each row are indicated by carets and the points of information loss are indicated by crosses. The earliest point of information loss occurs at 2.45pm, corresponding to the end of the first episode of "Rock Power" on NIKP 11. The latest point of new information that precedes this point is at 2.35pm, corresponding to the beginning of the second episode of "Rick Steves Europe" on KQED 9. Therefore a "move right" command from an initial state similar to FIG. 14, but with any grid row being active, will produce a final system state similar to FIG. 15. The new information line will be positioned at 2.35pm, and the same grid row will be active as in the initial state.

From the initial state shown in FIG. 15, the method of FIG. 13 finds that the end second episode of "Rock Power" is the grid's first point of information loss. The last point of new information to precede this is the beginning of "Raider's of the Lost Ark". Therefore in response to a "move right" command from FIG. 13, the information line will move to 2.55pm. The final state will be similar to FIG. 16, but with KBHK 12 as the active grid row. The same horizontal motion takes place regardless of which grid row is active in the initial state, and the active grid row in the final state will be the same as in the initial state.

From the initial state of FIG. 16, the first point of information loss is at 3.15pm, and the last point of new information preceding that is at 3.10pm. Therefore from grids similar to that of FIG. 16 with various different rows active, the final state after a "move right" command will be similar to FIG. 17 with the appropriate grid row active. From the initial state of FIG. 17, there is only one point of information loss and one point of new information visible in the grid. Although the points of new information and information loss on other grid rows are considered by the method (despite their not being visible), the latest point of new information to precede the earliest point of information loss is at 3.15pm, and so this will be the new position of the information line in response to a "move right" command.

Thus using this second embodiment of the grid-based invention, it requires only four "move right" inputs to move from an initial information line position as shown in FIG. 11 to a final information line position as shown in FIG. 12, regardless of which grid row is active. This contrasts with the "eight move right" commands that are required to reach the same position using the simpler first embodiment of the invention.

FIG. 18 is a flow chart diagram illustrating a process 1800 for calculating movements of the information line in response to a "move left" command, according to the second embodiment of the invention. Upon START, the process (1830) finds a "point of information loss" for each row visible in the grid. At the next step (1840), the process aligns the information line with the latest point of information loss. The process determines (1850) whether the information line still appears in the grid visible window. If yes, the process is terminated. If no, the process (1860) continues to find a half hour boundary HB at or immediately to the left of the new information line position. The process, at next step (1880), scrolls the grid to place the HB at the start of the new grid displayed period. The process is then terminated.

In other words, when moving left according to this second embodiment of the invention, the process is similar, but the results are not entirely symmetrical with the rightwards motion. FIG. 18 shows a flow chart for the leftwards motion. The system begins by finding the points of information loss for each line. When moving left, the point of new information on each row corresponds to the end of the first program to the left that is not intersected by the information line in the initial state. Note that point-based systems may adopt the convention that, when the information line is aligned with the end of program a and the beginning of program b on the same row, the information line is-regarded as only intersecting program b. Therefore in these systems whenever the information line is aligned with the end of a program on a given row, the point of new information for that row theoretically occurs one minute before the current position of the information line (i.e. one minute before the end of program a). However, as a result of this asymmetry in the way that the supplementary information display relates to the position of the information line, the points of new information on each grid row are not essential to the calculation of the grid motion. On each row the point of new information corresponds to the end of the program whose start corresponds to the point of information loss for that row. The points of new information and information loss for each grid row are indicated in FIGS. 19–22, to clarify the application of FIG. 18 to the various examples shown. It should be apparent that, if the information line is moved past the beginning of any program not intersected by the information line in the initial state, then the user would not be able to access supplementary program information for that program without using a subsequent "move right" command. That would constitute a "loss" of accessibility to program information during the movement of the information line that would violate the general conditions of the novel grid-based method. Therefore, having found the point of information loss for each grid row, the system aligns the information line with the latest point of information loss (i.e. the one closest to the information line, when moving left). Finally, the visible window is scrolled to maintain the visibility of the information line, if necessary.

Turning to FIG. 19, the points of new information and information loss are indicated for each grid row. The latest point of information loss is at the start of the 3.00pm episode of "Rugrats", and so this is where the method of FIG. 18 positions the information line in response to a "move left command". This leaves the system in a state similar to FIG. 20 (with a different active grid row). From the initial state of FIG. 20, the latest point of information loss is the start of the 2.45pm episode of "Rugrats", so after a "move left" command, the system state is as shown in FIG. 21. From this state in turn, the latest point of information loss is at 2.30pm, the start of the first "Rock Power" episode. Therefore a further "move left" command leaves the system in the state shown in FIG. 22. From that initial state in turn, the latest point of information is at 2.00pm, the start of "As Told by Ginger", and so a further "move left" command brings the information line back to the same position it had in FIG. 11.

FIGS. 14–17, 19–22 represent a situation where, according to the second embodiment of the invention, a sequence of four "move right" commands moves the information line from a 2.00pm starting position to a 3.15pm final position. A subsequent sequence of four "move left" commands moves the information back again to its original starting point. This is a more efficient method of navigating the EPG data shown in the figures than the first embodiment, since it requires half the number of user inputs to navigate the same amount of data. At the same time, when moving rightwards, supplementary information for every program in every row of the grid that airs between 2.00pm and 3.30pm is accessible from the starting state without ever requiring a "move left" command. Likewise, when moving back from 3.15pm to 2.00pm, supplementary information for every program is accessible without ever requiring a "move right" command. This facilitates a natural approach to browsing TV program data when users wish to select a program for viewing or recording. That is, to compare the programs available on the different channels at a first time, then move to a second time and compare the programs available then, etc. The second embodiment of the new invention ensures that the system automatically chooses the optimal times to move to at each stage, such that the system makes no more horizontal moves than are necessary to make all the program data accessible without backtracking. This occurs regardless of the actual start times and durations of the programs (examples are given below where the horizontal moves in response to each command are much larger than in FIGS. 14–17, 19–22).

However, unlike the first embodiment, the left/right motion produced by the second embodiment of the invention has minor asymmetries of type 3 as defined previously. The positions of the information line moving right from FIGS. 11 to 12 are 2.00pm, 2.35pm, 2.55pm, 3.10pm, and 3.15pm. Moving left, they are 3.15pm, 3.00pm, 2.45pm, 2.30pm, and 2.00pm. The discrepancies are minor, and unlikely to cause confusion to the user.

FIGS. 23 through 30 all derive from the same actually occurring EPG data, for a set of "user favorite" channels. They illustrate the flexibility of the new method, in producing whatever size of horizontal movement is most appropriate for the EPG data appearing in a given set of grid rows. In this case, only four "move right" commands are required to move the information line from a starting position of 8.30am to a final position of 2.30pm (an average of 90 minutes per move, with the largest move being 145 minutes in response to a single command). A subsequent sequence of four "move left" commands returns the information line to its starting position.

Turning to FIG. 23, when the system responds to a "move right" command according to the flow chart of FIG. 13, it determines that the earliest point of information loss occurs at 10.00am, at the end of the second episode of "Hill Street Blues" on BRAVO 59. The latest point of new information to precede this point is at 9.30am, the start of Adam's Rib. Therefore the new system state becomes the one shown in FIG. 24. FIG. 25 shows the programs that occur on the same set of channels at later times in the morning. From this figure, it can be seen that, if the system starts from an initial state as in FIG. 24, the first point of information loss occurs at 10.30am, at the end of "Making Of: Monsters, Inc" on BRAVO 9. This is because "Making Of: . . . " is the earliest show to end that is not intersected by the information line in FIG. 24. The last point of new information to precede that 10.30am is at 10.05, the start of "True Grit" on AMC 15. Therefore this is the next position of the information line. Since it lies outside the visible window of FIG. 24, the system finds the first half-hour boundary at least 15 minutes later than 10.05, which is at 10.30am. Therefore the visible window scrolls to a new grid displayed period of 9.00am to 10.30am and the new system state after the "move right" from FIG. 24 is as shown in FIG. 25.

FIGS. 26 and 27 show programs at later times for the same set of channels. It can be seen from these figures that the first ending of a program not intersected by the information line in FIG. 25 (i.e., the first point of information loss from the state of FIG. 25), occurs at 1.00pm, the ending of "The Cotton Club" on BRAVO 59. The latest point of new information to precede 1.00pm is at 12.30pm, the start of "Alien Nation" on AMC 15, and the first half-hour boundary at least 15 minutes later than this is at 1.00pm. Therefore in response to a single "move right" command from the state of FIG. 25, the system responds by moving to the state shown in FIG. 27. This is a move of 145 minutes, but it does not cause the user to miss any information about any of the programs airing between 10.05am and 1.00pm. This is because all of those programs are either intersected by the information line at 10.05am, or intersected by the information line at 12.30pm. Thus they are all accessible by vertical motion alone from either the state of FIG. 25 or the state of FIG. 27.

A similar example of the significantly greater efficiency provided by this embodiment of the new invention is seen in the response to a "move right" command starting from the system state shown in FIG. 27. It can be seen from FIGS. 28 and 29 that the first point of information loss from the state of FIG. 27 occurs at 2.55pm, the end of "Backstory" on AMC 15. The latest point of new information to precede that point is the 2.30pm start of "The China Lake Murder" on USAP 44, and the next half-hour boundary at least 15 minutes later than that occurs at 3.00pm. Therefore the method of FIG. 13 moves the information line from the position shown in FIG. 27 to the position shown in FIG. 29 in a single move. This is a movement of 120 minutes, which again constitutes the optimally efficient amount of movement that keeps supplementary information for all programs on all grid rows easily available.

It should be apparent that according to the method shown in FIG. 18, from an initial system state as shown in FIG. 29, the system responds to a sequence of four "move left" commands as follows. The first command moves the information line to 12.30pm; the second command moves it to 10.05am, the third to 9.00am, and the fourth to 8.30am. As compared to the previous four "move right" commands, there is only one instance of asymmetry other than the inevitable (and small) type 1 asymmetries as previously defined. That occurs when the third command leaves the system state as shown in FIG. 30, with the information line at 9.00am, whereas the first command in the opposite direction left the system state as in FIG. 24. The movement of the information line from 9.30am right to 10.05am, and then left from 10.05am to 9.00am is not symmetrical. It is noteworthy, however, that if a movement left from 10.05am to 9.00am is followed by a "move right" command, the information line moves completely symmetrically back to 10.05am, according to the method of FIGS. 13 and 18. As noted previously, occurrences of asymmetry other than of type 1 do not occur at all with the first embodiment of the new invention. With the second embodiment, minor asymmetries of types 3 and 4 do occur, but they are not large enough to be likely to cause user confusion. The commutativity of horizontal and vertical motion provided by the new method, together with the guaranteed accessibility of all program information on all grid rows without the need for backtracking, plus the much greater efficiency in traversing EPG data with widely varying program start times and durations, leads to an overall user interaction which is considerably improved over prior art methods.

1.3 Third Embodiment of the Invention: More Limited Visible Window Scrolling

The first two embodiments of the new invention described herein have followed the principle of giving priority to motion of the information line (or other indicator of the active point in time), and deriving the motion of the visible window from this. However, the third embodiment takes a grid-based approach to left/right navigation, which assigns a higher priority to minimizing the motion of the visible window, thereby in some circumstances placing a further restriction upon the motion of the information line.

There are several circumstances in which the minimization of visible window scrolling may be advantageous. For example, some interactive EPG systems download their EPG data from satellites or other sources in real time, maintaining only a subset of data in local storage. In such cases, it is typical for data for a relatively short period following the current time to be stored, and for delays to occur when scrolling the visible window to include other times, while new data is downloaded. The third embodiment of the new invention introduces an additional check before scrolling the visible window, which will often introduce one extra movement of the information within the current visible window before the next user input command causes the window to scroll. This may also provide the opportunity for the system to begin pre-loading the EPG data for the next time period, which may eliminate any delay in subsequently scrolling to the later time.

There are other advantages of placing limitations on the movement of the information line based upon the requirements of minimal window scrolling. Effectively, this approach requires the user to issue, for example, two "move right" commands to scroll the visible window, when other methods would have scrolled the window with only one command. This provides a kind of "safety mechanism" that prevents accidental scrolling of the visible window, which may be relatively more disorienting to the user than accidental moving of the information line within a given visible window. Furthermore, some users may find large movements of the information line disconcerting, such as the 145-minute movement between FIGS. 25 and 27. They may prefer to make an additional input command, moving the window show an intermediate grid displayed period such as that of FIG. 26. This will reassure them that they are not missing any information about programs in the intervening period between FIG. 25 and FIG. 27, even though the methods of the second embodiment of the invention are able to guarantee this.

Figure 31:
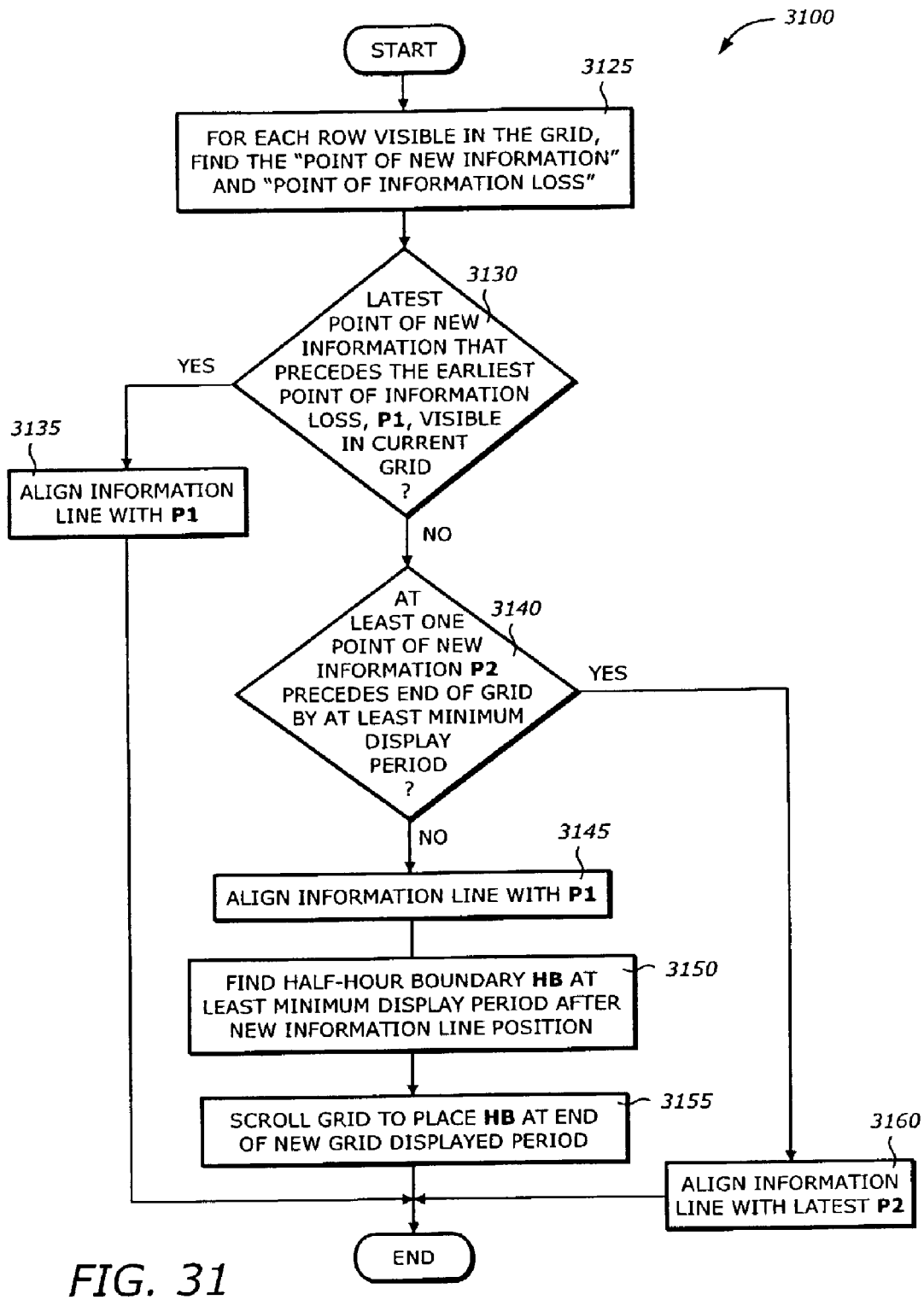
FIG. 31 is a flowchart for determining how to move the information line in response to a "move right' user input command in accordance with the third embodiment of the present invention.

FIG. 31 is a flow chart diagram illustrating a process 3100 for calculating movements of the information line when responding to a "move right" command according to the third embodiment of the invention. Upon START, the process (3125) finds a "point of new information" and "point of information loss" for each row visible in the grid. Next, the process at 3130 determines whether the latest point of new information that precedes the earliest point of information loss, P1, is visible in the current grid. If yes, at the next step (3135), the process aligns the information line with P1 and then terminates. If no, the process (3140) determines whether there is at least one point of new information P2 precedes end of grid by at least a minimum display period. If yes, the process aligns the information with the latest P2. The process is then terminated. If no, the process aligns the information with P1 (3145). The process then finds the half-hour boundary HB which is at least the minimum display period after the new information line position (3150). The process, at next step (3155), scrolls the grid to place the HB at the end of the new grid displayed period. The process is then terminated.

The horizontal navigation method of this third embodiment again ensures both commutativity of horizontal and vertical motion, and the accessibility of program information without requiring "backtracking". It also uses the information-theoretic calculation of the second embodiment, where the points of new information and information loss are determined for each line of the grid. The way in which the third embodiment differs from the second can be seen from the flow chart of figure 31 showing a flow chart for the response to a "move right" command. The second embodiment always makes the furthest movement compatible with the properties of the basic grid-based method, which is to move to the latest point of new information that precedes the earliest point of information loss. According to the method of the third embodiment shown in FIG. 31, if moving to that furthest point would cause the information line to move beyond the visible window, the system attempts to find an alternative point to move to. The alternative point chosen is the last point of new information that precedes the end of the currently visible grid by at least the minimum display period, if any such point of new information exists. This guarantees that, as much new information will be available after the "move right" command as is possible without scrolling of the visible window. In cases where no such new information appears in the current visible grid, the window is scrolled as in the second embodiment.

Figure 32:
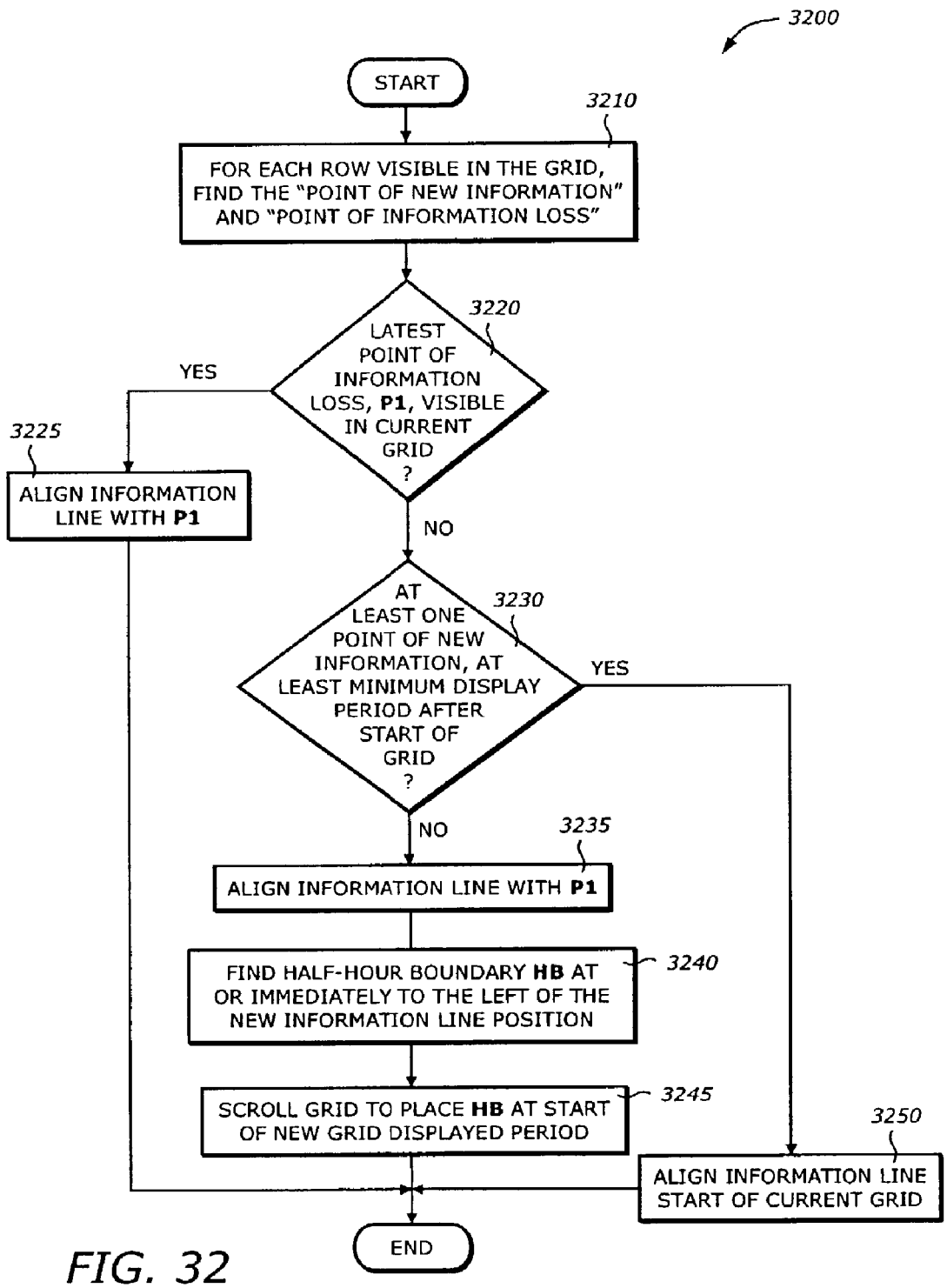
FIG. 32 is a flowchart for determining how to move the information line in response to a "move left" user input command in accordance with the third embodiment of the present invention.

FIG. 32 is a flow chart diagram illustrating a process 3200 for calculating movements of the information line when responding to a "move left" command according to the third embodiment. Upon START, the process (3225) finds a "point of new information" and "point of information loss" for each row visible in the grid. Next, the process at 3230 determines whether the latest point of new information that precedes the earliest point of information loss, P1, is visible in the current grid. If yes, at the next step (3235), the process aligns the information line with the P1 and then terminates. If no, the process determines whether there is at least one point of new information and at least a minimum display period after the start of the grid (3240). If yes, the process aligns the information with the start of the current grid (3260). The process is then terminated. If no, the process aligns the information with P1 (3245). The process then finds half-hour boundary HB at or immediately to the left of the new information line position (3250). The process, at next step (3255), scrolls the grid to place the HB at the start of new grid-displayed period. The process is then terminated.

In other words, FIG. 32 shows the flow chart for the response to a "move left" command according to this third embodiment. If the latest point of information loss is visible in the current grid, the resulting movement is the same as in the second embodiment. However, if that point is not currently visible, and there is at least one point of new information that is later than the start of the grid by at least the minimum display period, then the system aligns the information line with the start of the grid. This provides the maximum accessibility to new program information that is compatible with no movement of the visible window. However, if no such point of new information exists, window scrolling occurs as in the second embodiment.

Other embodiments of the invention are possible which follow the same basic approach as shown in FIGS. 31 and 32, but which behave differently when there is no suitable point to move to in the currently visible which provides new information. For example, an alternative embodiment could move to the first point that lies outside the currently visible grid that provides new information. In the case of a "move right" command, this would move the information line to align with the first program start on any grid row following the end of the current grid. Visible window scrolling could then proceed as in the other embodiments, leaving the new information line position at least the minimum display period before the end of the final grid. In such an embodiment, the response to a "move right" command from FIG. 25 would be to move to a system state with the same grid displayed period as shown in FIG. 26, but with the information line positioned at 11.30am and TCM 68 as the active grid row.

2. Description of Invention in a Second Example Application

All the embodiments of the invention detailed so far have been applied to systems where the active program in the grid is indicated by an information line. As noted previously, similar embodiments are possible in point-based systems using other graphical means for indicating the active point in time. However, other embodiments are also possible in a second class of applications, wherein the principles of grid-based horizontal navigation are applied to systems using the more traditional two-dimensional cell highlighting to indicate the active program. Such systems are inherently limited to moving the active program indicator in a way that is different on each grid row, because the sizes and positions of the grid cells are different on each row. However, movement of the visible window with respect to the EPG data is equivalent to a movement of all grid rows simultaneously by the same amount. It is therefore possible to use a grid-based approach to improve the efficiency of visible window scrolling in all previous systems, regardless of the methods previously used to determine the movement of the active program indicator.

2.1 Fourth Embodiment of the Invention: Combination with Traditional Methods The fourth embodiment of the present invention involves an improvement the window scrolling methods of previous systems, which allows for a movement of a variable number of grid-column widths in response to a single user input command. The actual multiple of grid column widths used in each case is determined by examining the EPG data for all currently visible grid rows. This includes EPG data for those same rows at times after the grid's displayed period (in the case of "move right" commands), and at times before the grid displayed period (in the case of "move left" commands).

The properties of this embodiment, as applied to movement of the visible window in systems, which use cell highlighting to indicate the active program, are as follows:

1. When moving right the visible window does not move so far that the start of the grid displayed period moves past the end of a program cell, on any grid row, which is not visible in the initial grid
2. When moving left the visible window does not move so far that the end of the grid displayed period moves past the beginning of a program cell, on any row, which is not currently visible in the initial grid.

These properties may be contrasted with the grid-based navigation properties as applied to systems that employ an information line. In the case of systems, which use an intrinsically row-based two-dimensional cell, highlight, the navigation properties may be expressed in terms of the visibility of program information in the displayed grids. There can be no guarantees about the accessibility of such information with out requiring backtracking, etc. However, the above two properties, for right and left motion respectively, provide a novel way of "taming" both cursor and visible window motion in otherwise "unconstrained" navigation systems. For EPG systems that previously did not implement a global limit on the amount of visible window scrolling, the effect of the new method is to occasionally restrict what might otherwise be a large amount of visible window motion. For EPG systems that previously did implement a global limit on the amount of visible window scrolling (typically 30 minutes), the effect of the new method is to occasionally allow a larger amount of visible window motion.

Figure 33:
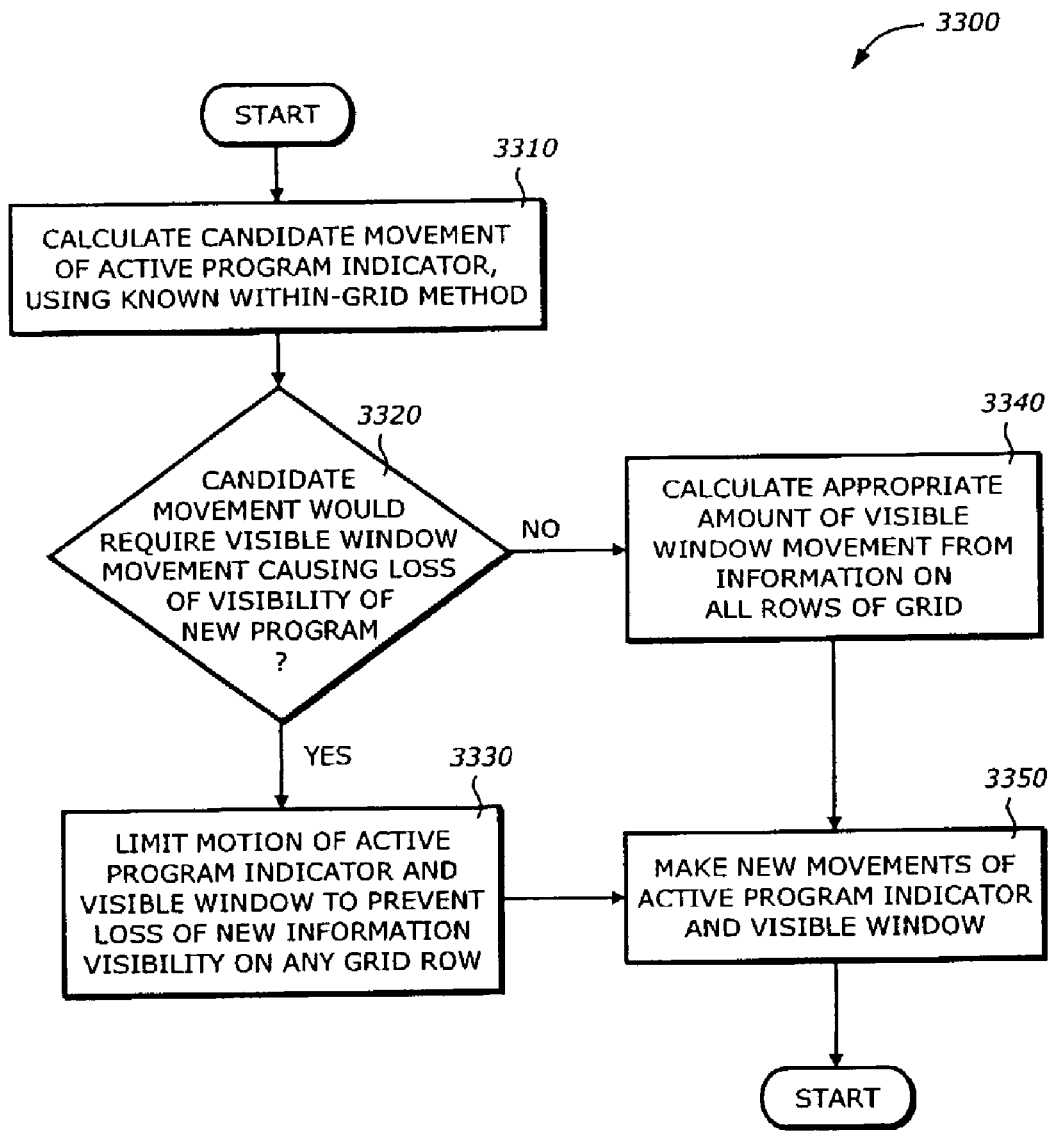
FIG. 33 is a flowchart for determining how to move the indicator of the active program in response to a horizontal navigation commands in accordance with the fourth embodiment of the present invention.

FIG. 33 shows a high-level flowchart of process 3300 that illustrates how the grid-based method may be combined with a variety of known techniques for moving the indicator of the active program. Upon START, the process calculates candidate movement of active program indicator by using known within-grid method (3330). The process continues to determine whether the candidate movement would require visible window movement causing loss of visible of new program (3340). If yes, the process limits motion of active program indicator and visible window to prevent loss of new information visibility on any grid row (3350). If no, the process calculates appropriate amount of visible window movement from information on all rows of the grid (3360). The process then continues to make new movements of active program indicator and visible window (3380). The process is then terminated.

It may be best understood by referring to some specific examples. In an example first system, the within-grid method of responding to a "move right" command is to move the active program indicator to the next program, whilst ensuring that as much as possible of the new program is visible in the final system state, including the program start. In this first example system, the candidate response to a "move right" command using the within-grid method would move from an initial state as shown in FIG. 34 to the state shown in FIG. 36. In an example second system, the within-grid method of responding to a "move right" command is to move the active program indicator to the next program, whilst ensuring that as much as possible of the new program is visible in the final system state, including the program end. In this second example system, the candidate response to a "move right" command using the within-grid method would move from an initial state as shown in FIG. 34 to the state shown in FIG. 35. In both these examples, the candidate movements would not cause any new program information to be "passed over", in the sense of not being visible in FIG. 34 because it lies to the right of the visible window, yet not being visible in FIG. 35 or 36 because it lies to the left of the visible window. Therefore in this case the improved system calculates an "appropriate" amount of visible window movement, without altering the candidate motion of the active program indicator. It is important to note here that in various implementations of this method, the appropriate amount of window movement may be less or greater than the amount required by the original motion of the active program indicator. For example, the visible window could be moved to show a grid displayed period of 6.00pm to 7.30pm, without violating the first property of this embodiment of the grid-based method; i.e., that the window should not move past the end of any program that is not visible in the initial state of FIG. 34. However, if the visible window were to move further to start at 6.30pm, this would move it past the end of the 6.00->6.30 episode of "Dexter's Laboratory", which is not visible in FIG. 34. Thus this last movement would be prevented by the methods of this embodiment.

Considering these same two example systems, which employ the methods of the fourth embodiment of the invention, regarding the response to a "move left" command. In the case of the first example system, starting from an initial state as in FIG. 34, the candidate response to a "move left" command using the within-grid method would be to move to a system state as shown in FIG. 36, wherein the active program indicator is positioned at the 2.00pm start of the "Anatomy of a Murder" program. In the case of a "move left" command according to the flowchart of FIG. 33, this candidate movement is not allowed, because scrolling the visible window to include the 2.00pm time would cause loss of visibility of new program information. Specifically, since the 5.00 to 5.30pm episode of "Courage the Cowardly Dog" is not visible in the initial grid of FIG. 35, it constitutes new program information that would be lost by any movement that caused the start of the visible window to scroll to a point earlier than 4.00pm. Thus at most the visible window can only scroll leftwards as far as 4.00pm using the methods of this embodiment of the invention. Thus in the case of the second example system, starting from an initial state as in FIG. 40, the candidate movement of the active program indicator would cause the visible window to scroll to 3.30pm, as shown in FIG. 40. The embodiment of the new grid method again determines that the "appropriate" amount of visible window scrolling is to a starting position no earlier than 4.00pm, which in this case is less than the amount seen in the previously used within-grid method.

The preceding examples show how, when combined with "row-based" methods for moving a conventional two-dimensional cell highlight indicating the active program, the new grid-based method leads to improved visible window scrolling behavior. The embodiment of the new method eliminates the cases where large horizontal scrolling of the visible window caused program information on grid rows other than the currently active row to be "missed". It thereby greatly reduces the occurrence of navigational problems where the user is required to "backtrack" in order to see information of interest on other rows of the grid.

Regarding methods that use a predetermined global limit on visible window scrolling (typically 30 minutes in response to each horizontal movement command), an example of the improvement of the new method can be seen by referring to FIG. 37. Starting from this initial state, methods placing a global limit on horizontal scrolling would typically respond to a "move right" command by moving the active program indicator to the "Rawhead Rex" program cell, highlighting the first 60 minutes of the program and leaving the position of the visible window unchanged. From that state, four additional "move right" commands would be required to move the visible window's starting position to 5.00pm, 5.30pm, 6.00pm, and then 6.30pm in order to leave the system in the state shown in FIG. 38. However, according to the method of FIG. 33 with an initial state as in FIG. 43, the system will calculate that all the programs that are airing at the end of the initial grid are also still airing at the beginning of the grid shown in FIG. 38. Therefore no loss of new information visibility would occur if the system scrolled from the grid of FIG. 37 to the grid of FIG. 38 in response to a single "move right" command. Thus in one variation of the new method, the system may calculate that the appropriate amount to move the visible window in this case is 120 minutes. Other variations are also consistent with the method of FIG. 33. For example, the system may respond to an initial "move right" command simply by relocating the active program indicator within the initial visible window of FIG. 37, and only on the second "move right" command moving to the state shown in FIG. 38. Another variation may determine that, since the visible window can scroll to a starting position of 7.30pm without moving past the end of a program that is not visible in FIG. 37, an appropriate amount to scroll the window in this case is 150 minutes in response to a single "move right" input. The precise amount of the movement may thus be calculated differently in different implementations of the invention according to this fourth embodiment. Design trade-offs may be made between maximal efficiency in motion and maximal reassurance to the user that no information is being missed in large window movements (even though the methods of the present invention may guarantee this). The embodiment of the new method simply increases the efficiency of interaction with the EPG, by in many cases reducing the number of commands required to achieve navigational goals. Moreover this new method does not introduce any new navigational asymmetries, and in this regard constitutes an improvement without drawbacks.

A wide variety of different embodiments of the invention are possible. They share in common the flexibility of the grid-based approach in dealing with different configurations of EPG data, by taking into account information from all rows visible in the grid. According to different design priorities such as maximizing efficiency of navigation, maximizing ease of recovery from errors, maximizing apparent similarity to methods already known to users, etc, different embodiments may employ navigation algorithms, which differ in the details as to how they use the data from the visible grid rows. Examples have been given in the figures of systems employing a one-dimensional information line as the indicator of the active program, which has a single position in the horizontal dimension but extends through all positions in the vertical dimension. However, other point-based visual indicators may also be used, such as icons or other graphical elements that may appear only at a single position both in the horizontal and vertical dimensions of the grid. In such cases, the same navigation algorithms may be applied as shown previously in the flowcharts. Furthermore, embodiments have been described wherein the new horizontal position of the visual indicator corresponds to the beginning of a program cell on a grid row that is not the currently active grid row. However, the same processes of determining the new position from program boundaries (as in the first embodiment), or points of new information and information loss (as in the second embodiment), may be used in cases where the new horizontal position of the visual indicator is offset from the start of the beginning of the previously determined program cell by some amount such as 5 minutes, 10 minutes, etc.

While certain embodiments are illustrated in the drawings and have been described herein, it will be apparent to those skilled in the art that many modifications can be made to the embodiments without departing from the inventive concepts described. Accordingly, the invention is not to be restricted except by the claims which follow.

The invention claimed is:

1. A user interface comprising:
   a visible window displaying program information of a plurality of program cells in an electronic program guide (EPG) grid; and
   a visual indicator in the visible window, the visual indicator being moved from a current position in a current row to a next position in response to one of a move right user command and a move left user command, the next position corresponding to a program cell in the plurality of program cells, said program cell being in another row.

2. The user interface of claim 1 wherein when the move right or move left command is performed within rows currently displayed in the visible window, a commutativity property is achieved.

3. The user interface of claim 1 wherein the visual indicator comprises:
   an information line being moved in response of the user command, the information line intersecting the plurality of program cells.

4. The user interface of claim 3 wherein the information line is moved to align with the next position corresponding to start of the program cell.

5. The user interface of claim 4 wherein a first boundary at a program increment is determined, the first boundary occurring at least a minimum display period after or before the next position if the next position is outside the visible window or less than the minimum display period from one of end and start of the visible window; and
   the visible window is scrolled such that the first boundary is at one of the end and the start of the visible window.

6. The user interface of claim 3 wherein points of new information and points of information loss are determined, the points of new information and the points of information loss being at start and end, respectively, of the program cells for the right move command, the points of new information and the points of information loss being at the end and the start, respectively, of the program cells for the left move command; and
   the next position being determined as a latest point of the points of new information that occurs before an earliest point of the points of information loss for the right move command, the next position being at a latest point of the points of information loss for the left move command.

7. The user interface of claim 6 wherein the information line is moved to the next position; and
the visible window is scrolled if the next position is outside the visible window or less than a minimum display period from one of end and start of the visible window.

8. The user interface of claim 7 wherein the information line is moved to an alternative point if the next position is outside the visible window, the alternative point being a last point of the points of new information that precedes end of the visible window by at least a minimum display period for a right move command, the alternative point being a point of new information that is later than start of the visible window by at least the minimum display period.

9. The user interface of claim 1 wherein the visual indicator comprises:
a highlighted program cell being moved in response to the user command; and
wherein
if the user command is a right move command, the visible window is scrolled to the right such that start of the visible window does not move past end of any one of the plurality of program cells which is not initially visible in the visible window; and
if the user command is the left move command, the visible window is scrolled to the left such that end of the visible window does not move past start of any one of the plurality of program cells which is not initially visible in the visible window.

10. The user interface of claim 1 further comprising:
a supplementary area to display supplementary information, the supplementary information being associated with the program cell.

11. A method comprising:
displaying program information of a plurality of program cells in a visible window, the plurality of program cells being in an electronic program guide (EPG) grid; and
moving a visual indicator in the visible window from a current position in a current row to a next position in response to one of a move right user command and a move left user command, the next position corresponding to a program cell in the plurality of program cells, said program cell being in another row.

12. The method of claim 11 wherein moving a visual indicator comprises
performing one of the move right command and a move left command within rows currently displayed in the visible window to achieve a commutativity property.

13. The method of claim 12 wherein moving a visual indicator comprises:
moving an information line in response of the user command, the information line intersecting the plurality of program cells.

14. The method of claim 13 wherein moving the information line comprises:
moving the information line to align with the next position corresponding to start of the program cell.

15. The method of claim 14 wherein moving the information line further comprises:
determining a first boundary at a program increment that occurs at least a minimum display period after or before the next position if the next position is outside the visible window or less than the minimum display period from one of end and start of the visible window; and
scrolling the visible window such that the first boundary is at one of the end and the start of the visible window.

16. The method of claim 13 wherein moving the information line comprises:
determining points of new information and points of information loss, the points of new information and the points of information loss being at start and end, respectively, of the program cells for the right move command, the points of new information and the points of information loss being at the end and the start, respectively, of the program cells for the left move command; and
determining the next position, the next position being a latest point of the points of new information that occurs before an earliest point of the points of information loss for the right move command, the next position being at a latest point of the points of information loss for the left move command.

17. The method of claim 16 wherein moving the information line further comprises:
moving the information line to the next position; and
scrolling the visible window if the next position is outside the visible window or less than a minimum display period from one of end and start of the visible window.

18. The method of claim 16 wherein moving the information line further comprises:
moving the information line to an alternative point if the next position is the visible window, the alternative point being a last point of the points of new information that precedes end of the visible window by at least a minimum display period for a right move command, the alternative point being a point of new information that is later than start of the visible window by at least the minimum display period.

19. The method of claim 11 wherein moving the visual indicator comprises:
moving a highlighted program cell in response to the user command;
if the user command is a right move command, scrolling the visible window to the right such that start of the visible window does not move past end of any one of the plurality of program cells which is not initially visible in the visible window; and
if the user command is the left move command, scrolling the visible window to the left such that end of the visible window does not move past start of any one of the plurality of program cells which is not initially visible in the visible window.

20. The method of claim 11 further comprising:
displaying supplementary information in a supplementary area, the supplementary information being associated with the program cell.

21. An article of manufacture comprising: a machine-accessible medium storina data that, when accessed by a machine, causes the machine to perform operations comprising: displaying program information of a plurality of program cells in a visible window, the plurality of program cells being in an electronic program guide (EPG) grid; and moving a visual indicator in the visible window from a current position in a current row to a next position in response to one of a move right user command and a move left user command, the next position corresponding to a program cell in the plurality of program cells, said program cell being in another row.

22. The article of manufacture of claim 21 wherein the data causing the machine to perform moving a visual indicator comprises data that, when accessed by machine, causes the machine to perform operations comprising:

performing one of the move right command and a move left command within rows currently displayed in the visible window to achieve a commutativity property.

23. The article of manufacture of claim 22 wherein the data causing the machine to perform moving a visual indicator comprises data that, when accessed by the machine, causes the machine to perform operations comprising:

moving an information line in response of the user command, the information line intersecting the plurality of program cells.

24. The article of manufacture of claim 23 wherein the data causing the machine to perform moving the information line comprises data that, when accessed by the machine, causes the machine to perform operations comprising:

moving the information line to align with the next position corresponding to start of the program cell.

25. The article of manufacture of claim 24 wherein the data causing the machine to perform moving the information line further comprises data that, when accessed by the machine, causes the machine to perform operations comprising:

determining a first boundary at a program increment that occurs at least a minimum display period after or before the next position if the next position is outside the visible window or less than the minimum display period from one of end and start of the visible window; and scrolling the visible window such that the first boundary is at one of the ends and the start of the visible window.

26. The article of manufacture of claim 23 wherein the data causing the machine to perform moving the information line comprises data that, when accessed by the machine, causes the machine to perform operations comprising:

determining points of new information and points of information loss, the points of new information and the points of information loss being at start and end, respectively, of the program cells for the right move command, the points of new information and the points of information loss being at the end and the start, respectively, of the program cells for the left move command; and determining the next position, the next position being a latest point of the points of new information that occurs before an earliest point of the points of information loss for the right move command, the next position being at a latest point of the points of information loss for the left move command.

27. The article of manufacture of claim 26 wherein the data causing the machine to perform moving the information line further comprises data that, when accessed by the machine, causes the machine to perform operations comprising:

moving the information line to the next position; and scrolling the visible window if the next position is outside the visible window or less than a minimum display period from one of end and start of the visible window.

28. The article of manufacture of claim 26 wherein the data causing the machine to perform moving the information line further comprises data that, when accessed by the machine, causes the machine to perform operations comprising:

moving the information line to an alternative point if the next position is the visible window, the alternative point being a last point of the points of new information that precedes end of the visible window by at least a minimum display period for a right move command, the alternative point being a point of new information that is later than start of the visible window by at least the minimum display period.

29. The article of manufacture of claim 21 wherein the data causing the machine to perform moving the visual indicator comprises data that, when accessed by the machine, causes the machine to perform operations comprising:

moving a highlighted program cell in response to the user command;

if the user command is a right move command, scrolling the visible window to the right such that start of the visible window does not move past end of any one of the plurality of program cells which is not initially visible in the visible window; and if the user command is the left move command, scrolling the visible window to the left such that end of the visible window does not move past start of any one of the plurality of program cells which is not initially visible in the visible window.

30. The article of manufacture of claim 21 wherein the data further comprises data that, when accessed by the machine, causes the machine to perform operations comprising:

displaying supplementary information in a supplementary area, the supplementary information being associated with the program cell.

31. A system comprising:

a processor; and a memory coupled to the processor, the memory containing program code that, when executed by the processor, causes the processor to:

display program information of a plurality of program cells in a visible window, the plurality of program cells being in an electronic program guide (EPG) grid. and move a visual indicator in the visible window from a current position in a current row to a next position in response to one of a move right user command and a move left user command, the next position corresponding to a program cell in the plurality of program cells, said program cell being in another row.

32. The system of claim 31 wherein the program code causing the processor to move a visual indicator comprises program code that, when executed by the processor, causes the processor to:

performing one of the move right command and a move left command within rows currently displayed in the visible window to achieve a commutativity property.

33. The system of claim 32 wherein the program code causing the processor to move a visual indicator comprises program code that, when executed by the processor, causes the processor to:

move an information line in response of the user command, the information line intersecting the plurality of program cells.

34. The system of claim 33 wherein the program code causing the processor to move the information line comprises program code that, when executed by the processor, causes the processor to:

move the information line to align with the next position corresponding to start of the program cell.

35. The system of claim 34 wherein the program code causing the processor to move the information line further comprises program code that, when executed by the processor, causes the processor to:
- determine a first boundary at a program increment that occurs at least a minimum display period after or before the next position if the next position is outside the visible window or less than the minimum display period from one of end and start of the visible window; and
- scroll the visible window such that the first boundary is at one of the ends and the start of the visible window.

36. The system of claim 33 wherein the program code causing the processor to move the information line comprises program code that, when executed by the processor, causes the processor to:
- determine points of new information and points of information loss, the points of new information and the points of information loss being at start and end, respectively, of the program cells for the right move command, the points of new information and the points of information loss being at the end and the start, respectively, of the program cells for the left move command; and
- determine the next position, the next position being a latest point of the points of new information that occurs before an earliest point of the points of information loss for the right move command, the next position being at a latest point of the points of information loss for the left move command.

37. The system of claim 36 wherein the program code causing the processor to move the information line further comprises program code that, when executed by the processor, causes the processor to:
- move the information line to the next position; and
- scroll the visible window if the next position is outside the visible window or less than a minimum display period from one of end and start of the visible window.

38. The system of claim 36 wherein the program code causing the processor to move the information line further comprises program code that, when executed by the processor, causes the processor to:
- move the information line to an alternative point if the next position is outside the visible window, the alternative point being a last point of the points of new information that precedes end of the visible window by at least a minimum display period for a right move command, the alternative point being a point of new information that is later than start of the visible window by at least the minimum display period.

39. The system of claim 31 wherein the program code causing the processor to move the visual indicator comprises program code that, when executed by the processor, causes the processor to:
- move a highlighted program cell in response to the user command;
- if the user command is a right move command, scroll the visible window to the right such that start of the visible window does not move past end of any one of the plurality of program cells which is not initially visible in the visible window; and
- if the user command is the left move command, scroll the visible window to the left such that end of the visible window does not move past start of any one of the plurality of program cells which is not initially visible in the visible window.

40. The system of claim 31 wherein the program code further comprises program code that, when executed by the processor, causes the processor to:
- display supplementary information in a supplementary area, the supplementary information being associated with the program cell.

* * * * *